US011200087B2

(12) United States Patent
Kim et al.

(10) Patent No.: US 11,200,087 B2
(45) Date of Patent: Dec. 14, 2021

(54) WEARABLE DEVICE FOR EXECUTING PLURALITY OF APPLICATIONS AND METHOD OF OPERATING SAME

(71) Applicant: Samsung Electronics Co., Ltd, Suwon-si (KR)

(72) Inventors: Ji-Eun Kim, Seoul (KR); Jong-Kee Lee, Seoul (KR); Eun-Bi Kim, Seoul (KR); Soo-Jung Lee, Seoul (KR); Ju-Eun Lee, Seoul (KR); Shin-Jae Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 222 days.

(21) Appl. No.: 16/239,859

(22) Filed: Jan. 4, 2019

(65) Prior Publication Data
US 2019/0213037 A1    Jul. 11, 2019

(30) Foreign Application Priority Data

Jan. 8, 2018  (KR) .......................... 10-2018-0002340

(51) Int. Cl.
*G06F 9/44*  (2018.01)
*G06F 9/48*  (2006.01)
*G06F 3/0488*  (2013.01)
*G06F 1/16*  (2006.01)
*G06F 3/0481*  (2013.01)
(Continued)

(52) U.S. Cl.
CPC ................ *G06F 9/48* (2013.01); *G06F 1/163* (2013.01); *G06F 3/0486* (2013.01); *G06F 3/04817* (2013.01); *G06F 3/04842* (2013.01); *G06F 3/04883* (2013.01); *G06F 3/04886* (2013.01); *Y02W 10/10* (2015.05)

(58) Field of Classification Search
CPC ...................................................... G06F 9/48
USPC ........................................................ 718/108
See application file for complete search history.

(56) References Cited

U.S. PATENT DOCUMENTS 9,992,314 B2 * 6/2018 Beason ................ G01C 21/265
2006/0101116 A1 * 5/2006 Rittman .............. H04L 12/1813
709/204
(Continued)

FOREIGN PATENT DOCUMENTS

EP    2838008 A2 *  2/2015 ............. G04G 21/00
EP    2838008 A2    2/2015
(Continued)

OTHER PUBLICATIONS

European Patent Office, "European Search Report," Application No. EP19150533.8, dated Apr. 3, 2019, 9 pages.

*Primary Examiner* — Evral E Bodden

(57) ABSTRACT

Disclosed is a wearable device including a touch screen and a processor configured to display an execution screen of a first application on the touch screen, receive a first input for simultaneously executing the first application and a second application related to the first application, and display a first execution screen corresponding to the execution screen in a first part of the touch screen and a second execution screen among a plurality of execution screens corresponding to the second application in a second part of the touch screen, different from the first part, in response to the first input, wherein the second part surrounds the first part.

19 Claims, 19 Drawing Sheets

(51) Int. Cl.
    *G06F 3/0486*    (2013.01)
    *G06F 3/0484*    (2013.01)

(56) References Cited

U.S. PATENT DOCUMENTS

| | | | |
|---|---|---|---|
| 2015/0105125 A1* | 4/2015 | Min | H04M 1/72583 455/566 |
| 2015/0135086 A1* | 5/2015 | Lee | A61B 5/1118 715/739 |
| 2015/0309689 A1* | 10/2015 | Jin | G06F 3/04883 715/765 |
| 2016/0306442 A1 | 10/2016 | Lee et al. | |
| 2017/0185250 A1 | 6/2017 | Cho et al. | |
| 2017/0285871 A1* | 10/2017 | Jung | G06F 3/014 |

FOREIGN PATENT DOCUMENTS

| | | | | |
|---|---|---|---|---|
| EP | 3128472 A1 * | 2/2017 | | G04G 9/0064 |
| EP | 3128472 A1 | 2/2017 | | |
| KR | 10-2016-0085125 A | 7/2016 | | |
| KR | 10-2016-0123879 A | 10/2016 | | |
| KR | 10-2017-0077714 A | 7/2017 | | |

* cited by examiner

WEARABLE DEVICE FOR EXECUTING PLURALITY OF APPLICATIONS AND METHOD OF OPERATING SAME

CROSS-REFERENCE TO RELATED APPLICATION

This application is based on and claims priority under 35 U.S.C. § 119 to Korean Patent Application No. 10-2018-0002340 filed on Jan. 8, 2018 in the Korean Intellectual Property Office, the disclosure of which is incorporated by reference herein in its entirety.

BACKGROUND

1. Field

The present disclosure relates to a wearable device for executing a plurality of applications and a method of operating the same.

2. Description of Related Art

Various services and additional functions provided through wearable devices, such as portable electronic devices, have been gradually expanding. In order to increase the effective value of wearable electronic devices and satisfy various user needs, communication service providers and electronic device manufacturers have provided various functions and have competitively developed electronic devices that are differentiated from those of other companies.

With the advancement of the performance of wearable electronic devices, such wearable electronic devices have become capable of executing various applications. Users can acquire various pieces of information and receive that information through various applications applied to the wearable electronic devices.

Thus, it may be important for the wearable electronic devices described above to provide various pieces of information.

SUMMARY

A wearable device has a display that is relatively smaller than a portable electronic device such as a smart phone, and thus has difficulty in displaying a large amount of data or information at once.

Accordingly, the wearable device uses a method of displaying data provided by an application in a limited display area as effectively as possible. However, when a plurality of applications is simultaneously executed, it is difficult to display data or information provided by the plurality of applications on a display that has a limited size. That is, even though the wearable device executes a plurality of applications, the wearable device is incapable of simultaneously displaying data provided by the plurality of applications through the limited display.

Accordingly, the wearable device is limited to displaying data for one application on the display and newly executing a task of another application after the task of the first application ends. The user is thus inconvenienced in receiving data or information provided by the plurality of applications through the display of the wearable device.

According to various embodiments of the present disclosure, a wearable device, as well as a method of operating the same, that is capable of displaying a user interface for simultaneously executing a first application which is being executed, a second application that is linked to the first application, and including all of the execution screen of the first application and the execution screen of the second application, may be provided.

In accordance with an aspect of the present disclosure, a wearable device is provided. The wearable device includes: a touch screen; and a processor configured to display an execution screen of a first application on the touch screen, receive a first input for simultaneously executing the first application and a second application related to the first application, and display a first execution screen corresponding to the execution screen in a first part of the touch screen and a second execution screen, from among a plurality of execution screens corresponding to the second application, in a second part of the touch screen different from the first part, in response to the first input, wherein the second part surrounds the first part.

In accordance with another aspect of the present disclosure, a method of operating a wearable device is provided. The method includes: displaying an execution screen of a first application on a touch screen of the wearable device; receiving a first input for simultaneously executing the first application and a second application related to the first application; and displaying a first execution screen corresponding to the execution screen in a first part of the touch screen and a second execution screen from among a plurality of execution screens corresponding to the second application in a second part of the touch screen that is different from the first part, in response to the first input, wherein the second part surrounds the first part.

In accordance with another aspect of the present disclosure, a computer-readable recording medium that stores a program that executes operations is provided. The operations include: displaying an execution screen of a first application on a touch screen of the wearable device; receiving a first input for simultaneously executing the first application and a second application related to the first application; and displaying a first execution screen corresponding to the execution screen in a first part of the touch screen and a second execution screen from among a plurality of execution screens corresponding to the second application in a second part of the touch screen that is different from the first part, in response to the first input, whereby the second part surrounds the first part.

A wearable device, according to various embodiments of the present disclosure, has the effect of displaying a user interface including all of the execution screen of a first application and the execution screen of a second application and supporting the interaction between the first application and the second application through the user interface.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
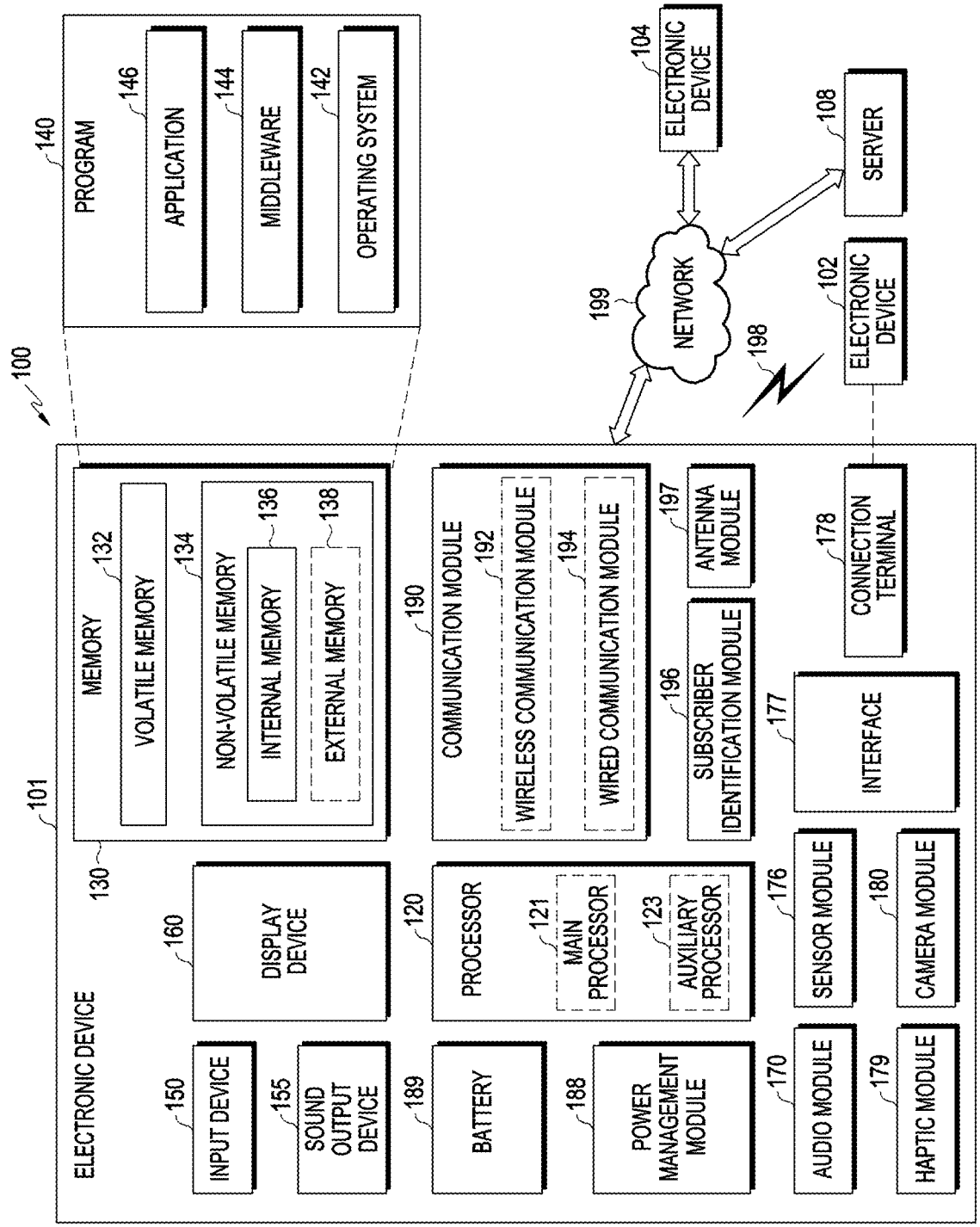
FIG. 1 illustrates a block diagram of an electronic device within a network environment according to various embodiments.

FIG. 1 illustrates a block diagram of an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute the at least one of the one or more instructions, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
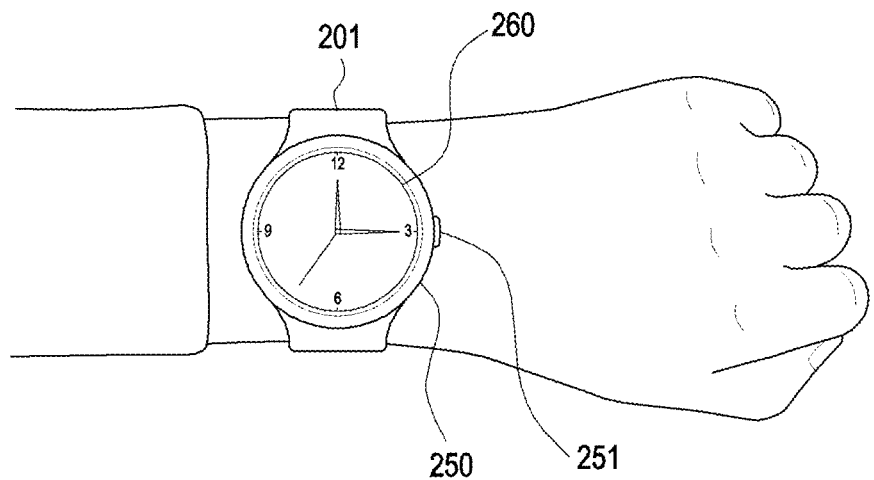
FIG. 2 schematically illustrates a wearable device according to various embodiments of the present disclosure.

FIG. 2 schematically illustrates a wearable device according to various embodiments of the present disclosure.

Referring to FIG. 2, an electronic device 201 may include a first input device 250, a second input device 251, and a touch screen 260. The electronic device 201 may be implemented to be the same as the electronic device 101 and/or 102 of FIG. 1. For example, the electronic device 201 may be implemented as a wearable device or a wearable electronic device. Hereinafter, for convenience of description, it is assumed that the electronic device 201 is implemented as a wearable device, but the technical idea of the present disclosure is not limited thereto.

According to an embodiment, the electronic device 201 may be implemented as a smart watch. A processor (for example, the processor 120 of FIG. 1) included in the electronic device 201 may control the overall operation of the electronic device 201. Hereinafter, for convenience of description, it is assumed that the operation of the electronic device 201 is controlled by the processor (for example, the processor 120 of FIG. 1).

The electronic device 201 may display data or information through the touch screen 260. The electronic device 201 may display data stored in a memory (for example, the memory 130 of FIG. 1) through the touch screen 260. For example, the electronic device 201 may display data or information provided by at least one application stored in the memory (for example, the memory 130 of FIG. 1) through the touch screen 260. Further, the electronic device 201 may display an execution screen and/or an execution state of at least one application through the touch screen 260.

The touch screen 260 may be implemented to be the same as or similar to the display device of FIG. 1 (for example, the display device 160 of FIG. 1).

According to an embodiment, the touch screen 260 may display a user interface for performing a function of the electronic device 201. For example, the touch screen 260 may display an execution screen of at least one application stored in the electronic device 201. Further, the touch screen 260 may simultaneously display execution screens of a plurality of applications stored in the electronic device 201.

According to an embodiment, through the touch screen 260, the electronic device 201 may identify at least one of a touch input, drag input (or touch-drag input), swipe input, and pinch input on the touch screen 260.

The first input device 250 may generate an input signal in response to an input to the electronic device 201. For example, the first input device 250 may be implemented in the form of a bezel of a watch. The user may rotate the first input device 250 in a first direction (for example, a clockwise direction) or a second direction (for example, a counterclockwise direction), and the electronic device 201 may identify the input corresponding to the rotation.

The electronic device 201 may further include the second input device 251. For example, the second input device 251 may be implemented in the form of a watch stem. The user may rotate the second input device 251 and press the second input device 251, and the electronic device 201 may identify the input corresponding to the rotation or pressing.

The electronic device 201 may further include a speaker (for example, the sound output device 155 of FIG. 1). For example, the electronic device 201 may provide information in the form of a voice or a sound through the speaker 155.

Hereinafter, the execution screen may be a screen on which a corresponding application is executed and that indicates an execution state. That is, the execution screen implies that the corresponding application has already been executed or is being executed.

Figure 3:
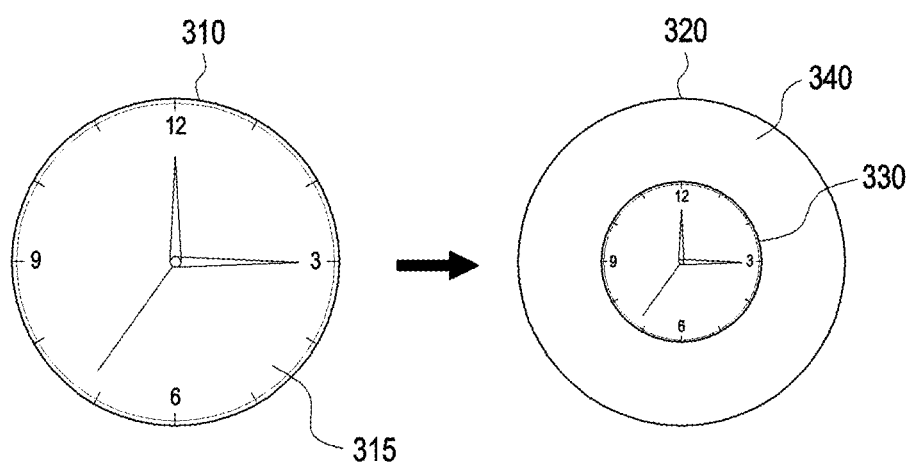
FIG. 3 illustrates the operation in which the wearable device displays a user interface according to various embodiments of the present disclosure.

FIG. 3 illustrates the operation in which the wearable device displays a user interface according to various embodiments of the present disclosure.

Referring to FIG. 3, the electronic device (for example, the electronic device 201 of FIG. 2) may display a first user interface 310 through the touch screen (for example, the touch screen 260 of FIG. 2). For example, the electronic device 201 may execute a first application and display the first user interface 310 including an execution screen 315 of the first application on the touch screen 260. The first user interface 310 may display the execution screen 315 of the first application in the entire area (or a partial area) of the touch screen 260. The first application may be one of a plurality of applications stored in the electronic device 201. For example, the first application may be an application related to a watch.

The electronic device 201 may receive a first input for simultaneously executing the first application and a second application related to the first application. The electronic device 201 may execute the second application in response to the first input. For example, the first input may be configured as various gesture or input (or touch input) types by the user or the processor 120. For example, the first input may be a long-press input on the touch screen 260.

According to various embodiments, the second application may be an application related to the first application. For example, the second application may be an application suitable for use together with the first application. The second application may be manually determined by the user or may be automatically determined by the processor (for example, the processor 120 of FIG. 1). The processor 120 may determine the second application randomly or by analyzing the usage patterns of the user. For example, the processor 120 may select the second application from among the plurality of applications stored in the electronic device 201 on the basis of at least one of a type, the number of executions, and the execution time of the application executed after the first application ends. Alternatively, the processor 120 may determine, as the second application, an application which is determined to have a high correlation with the first application from among the plurality of applications stored in the electronic device 201. For example, when the first application is an application related to a watch, the second application may be an application related to schedule management.

According to various embodiments, the second application may be an application independent from the first application. For example, the electronic device 201 may display candidates of the (at least one) application to be additionally executed in response to a command for displaying the execution screens of a plurality of applications together (or simultaneously) and may display the execution screens of the selected applications from among the candidates together with the displayed existing execution screen of the application.

The electronic device 201 may display a second user interface 320 on the touch screen 260 in response to the first input. For example, the second user interface 320 may include a first execution screen 330 of the first application displayed in a first part of the touch screen 260 and a second execution screen 340 of the second application displayed in a second part of the touch screen 260. For example, the first part may correspond to a center area of the touch screen 260, which is smaller than the entire area thereof. The second part may be an area different from the first part. For example, the second part may be an area surrounding the first part.

According to an embodiment, the first execution screen 330 may be an execution screen suitable for being displayed in the first part of the touch screen 260. For example, the first execution screen 330 may be a screen obtained by reducing the execution screen 315 of the first application, or may be at least a part of the execution screen 315. The second execution screen 340 may be an execution screen suitable for being displayed in the second part of the touch screen 260, from among a plurality of execution screens of the second application. For example, the second execution screen 340 may be an execution screen surrounding the first execution screen from among the plurality of execution screens of the second application. That is, the second execution screen 340 may be implemented to surround the first execution screen 330.

Although FIG. 3 illustrates the first execution screen 330 and the second execution screen 340 in a circular shape for convenience of description, the technical idea of the present disclosure is not limited thereto. According to an embodiment, shapes of the first execution screen 330 and the second execution screen 340 may be determined according to the display type of the electronic device or the wearable device. For example, when the shape of the smart watch is a rectangle, the first execution screen 330 and the second execution screen 340 may be implemented in a rectangular shape.

Figure 4A:
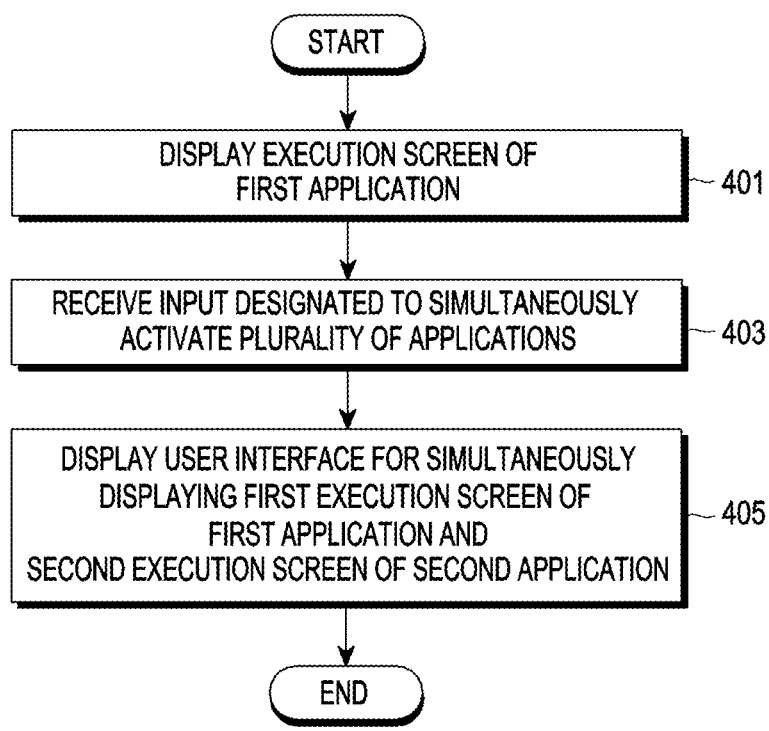
FIG. 4A illustrates a flowchart of the operation of the wearable device according to various embodiments of the present disclosure.

FIG. 4A illustrates a flowchart of the operation of the wearable device according to various embodiments of the present disclosure.

Referring to FIG. 4A, the electronic device (for example, the electronic device 201 of FIG. 2) may execute the first application and display the execution screen of the first application on the touch screen (for example, the touch screen 260 of FIG. 2) in step 401.

The electronic device 201 may receive an input designated to simultaneously activate a plurality of applications in step 403. For example, the electronic device 201 may receive first input for simultaneously activating the first application and the second application related to the first application. For example, the electronic device 201 may receive a long-press input on the execution screen of the first application.

The electronic device 201 may display a user interface for simultaneously displaying a first execution screen of the first application and a second execution screen of the second application in step 405. For example, the user interface may display the first execution screen in a first part of the touch screen 260 and the second execution screen in a second part of the touch screen 260.

Figure 4B:
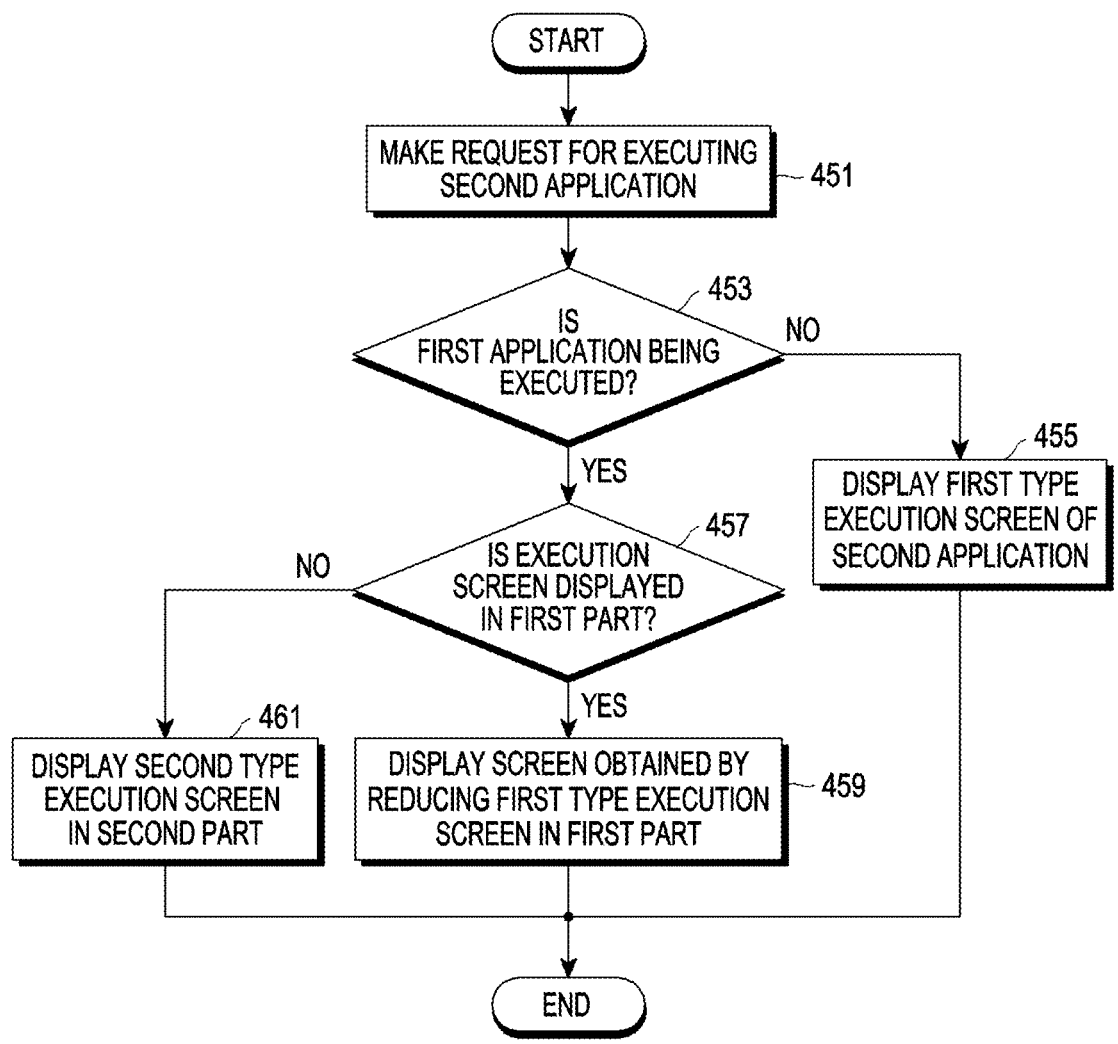
FIG. 4B illustrates a flowchart of the operation of the wearable device according to various embodiments of the present disclosure.

FIG. 4B illustrates a flowchart of the operation of the wearable device according to various embodiments of the present disclosure.

Referring to FIG. 4B, the electronic device (for example, the electronic device 201 of FIG. 2) may receive a request for executing the second application in step 451. For example, the electronic device 201 may execute the second application in response to user input.

The electronic device 201 may determine whether the first application is executed in step 453. For example, the electronic device 201 may determine whether the first application is being executed before the second application, for which execution is requested.

When the first application is not running (No of step 453), the electronic device 201 may display a first-type execution screen from among the plurality of execution screens of the second application on the touch screen (for example, the touch screen 260 of FIG. 2) in step 455. For example, the first-type execution screen may be an execution screen displayed in the entire area of the touch screen 260.

When the first application is being executed (Yes of step 453), the electronic device 201 may determine whether to display the execution screen of the second application in the first part of the touch screen 260 in step 457. For example, the first part may be a part corresponding to the center area of the touch screen 260. Further, the first part may be an area smaller than the entire area of the touch screen 260.

When the execution screen of the second application is displayed in the first part (Yes of step 457), the electronic device 201 may display a screen obtained by reducing the first-type execution screen from among the plurality of execution screens of the second application or a screen corresponding to at least the part of the first-type execution screen in the first part of the touch screen 260 in step 459.

When the execution screen of the second application is not displayed in the first part (No of step 457), the electronic device 201 may display a second-type execution screen from among the plurality of execution screens of the second application in the second part of the touch screen 260 in step 461. For example, the second part may be a part surrounding the first part of the touch screen 260. That is, the execution screen of the second application displayed in the second part may be different from the execution screen of the second application displayed in the first part or the entire part.

According to various embodiments, the first-type execution screen and the second-type execution screen may be screens having different configurations in order to display particular states of the application. For example, when the second application is a schedule management application and the current state of the application corresponds to "display the schedule for Dec. 1, 2017", the first-type execution screen may be a screen having a configuration corresponding to a general calendar form. The second-type execution screen may be screen having a configuration with a closed-loop form and that indicates a schedule in at least one position in the loop form. The screen in the loop form will be described below in more detail. That is, the second-type execution screen may be a screen having a configuration different from that of the first-type execution screen, rather than the screen obtained by reducing the first-type execution screen or the screen obtained by cropping the first-type execution screen.

According to various embodiments, the electronic device 201 may be configured to provide the first-type execution screen when a particular application is displayed alone on the entire screen.

According to various embodiments, when the particular application is displayed together with another application in a particular area (for example, a center area), the electronic device 201 may display a screen obtained by reducing the first-type execution screen or a screen generated by cropping at least a part of the first-type execution screen.

According to various embodiments, when the particular application is displayed together with another application in a particular area (for example, a peripheral area surrounding the center area), the electronic device 201 may display the second-type execution screen, which has a configuration different from that of the first-type execution screen.

Figure 5:
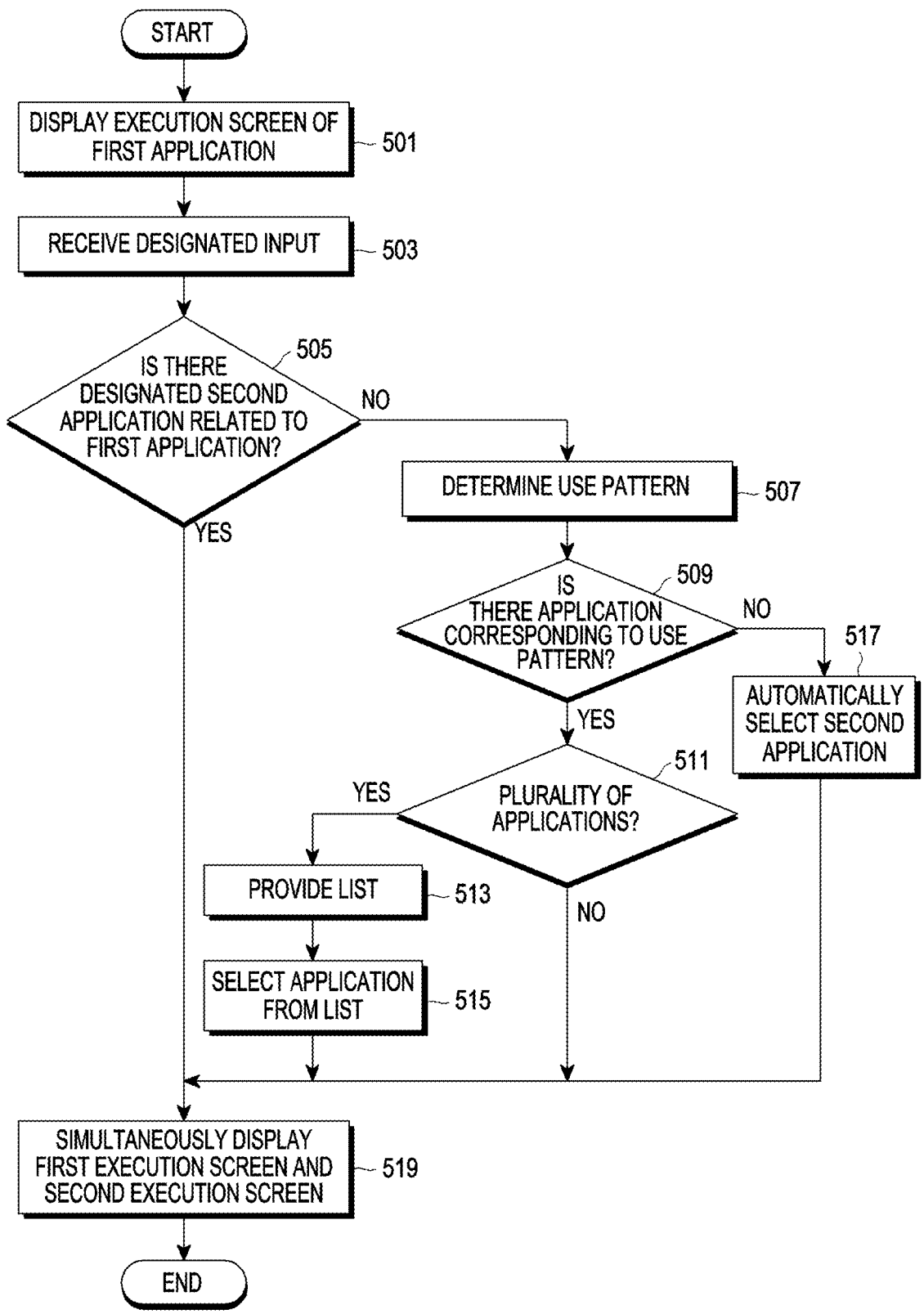
FIG. 5 is a flowchart illustrating the operation of the wearable device according to various embodiments of the present disclosure.

FIG. 5 illustrates a flowchart of an operation of the wearable device according to various embodiments of the present disclosure.

Referring to FIG. 5, the electronic device (for example, the electronic device 201 of FIG. 2) may execute the first application and display the execution screen of the first application on the touch screen (for example, the touch screen 260 of FIG. 2) in step 501.

The electronic device 201 may receive an input designated to simultaneously execute the first application and the second application related to the first application in step 503. For example, the designated input may be a long-press input on the touch screen 260.

The electronic device 201 may determine whether the second application related to the first application is designated in step 505. For example, the electronic device 201 may determine whether the second application, which is configured to be used together with the first application, is designated. At this time, the second application may be designated by the user or the processor (for example, the processor 120 of FIG. 1).

When the second application is designated (Yes of step 505), the electronic device 201 may display a first execution screen of the first application and a second execution screen of the designated second execution screen on the touch screen 260 in step 519. For example, the electronic device 201 may display the first execution screen in a first part of the touch screen 260 and the second execution screen in a second part of the touch screen 260.

When the second application is not designated (No of step 505), the electronic device 201 may determine the use pattern of the first application in step 507. The electronic device 201 may determine the use pattern of the first application and decide on a second application having a high correlation with the first application according to the determination result. For example, the electronic device 201 may determine the second application based on the type, the execution time, and/or the number of executions of the application before the first application is executed or after the execution of the first application ends.

When there is no application corresponding to the use pattern of the first application (No of step 509), the electronic device 201 may select the second application arbitrarily (or automatically). The electronic device 201 may simultaneously display the first execution screen of the first application and a second execution screen of the arbitrarily selected second application on the touch screen 260 in step 519.

When there is an application corresponding to the use pattern of the first application (Yes of step 509), the electronic device 201 may determine, in step 511, whether the number of applications corresponding to the use pattern is plural.

When the number of applications corresponding to the use pattern is not plural (No of step 511), the electronic device 201 may simultaneously display the first execution screen of the first application and the second execution screen of the second application corresponding to the use pattern on the touch screen 260 in step 519.

According to various embodiments, when the number of applications corresponding to the use pattern is plural (Yes of step 511), the electronic device 201 may display (or provide) a list of the plurality of applications on the touch screen 260 in step 513.

The electronic device 201 may receive the selection for one of the plurality of applications included in the list in step 515. For example, the user may select, as the second application related to the first application, one application from among the plurality of applications included in the list.

The electronic device 201 may simultaneously display the first execution screen of the first application and the selected second execution screen of the second application on the touch screen 260 in step 519.

According to various embodiments, when the number of applications corresponding to the use pattern is plural (Yes of step 511), the electronic device 201 may simultaneously display the first execution screen of the first application and the execution screens of the plurality of applications on the touch screen 260.

Figure 6:
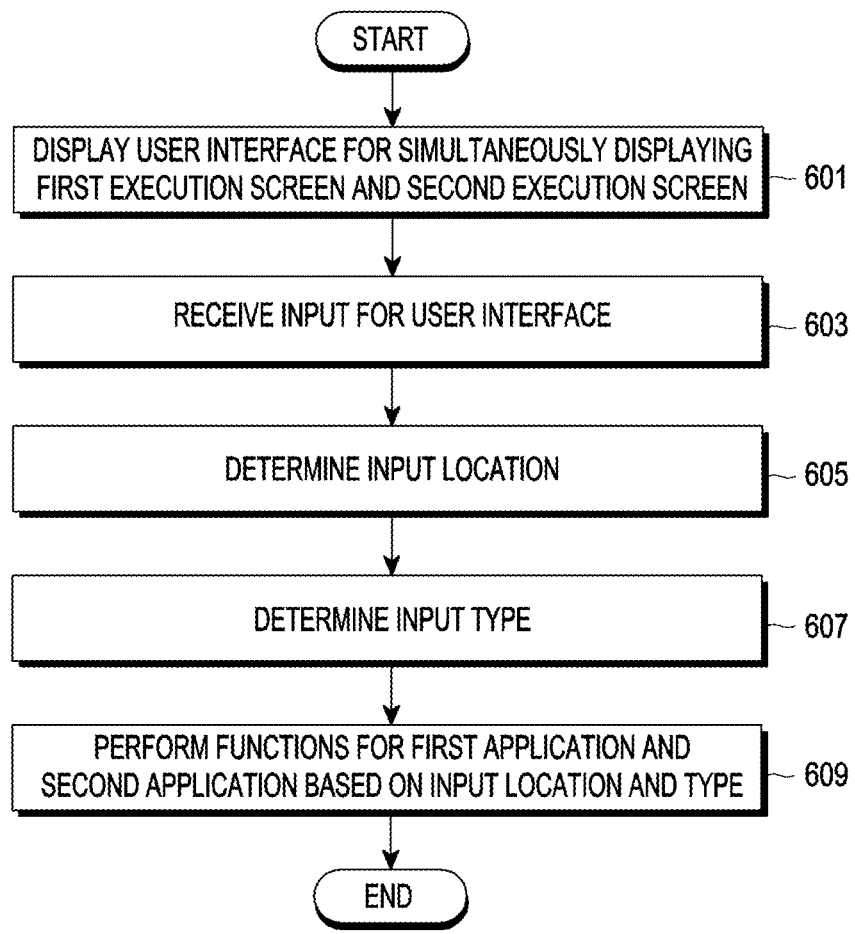
FIG. 6 illustrates a flowchart of the operation of the wearable device according to various embodiments of the present disclosure.

FIG. 6 illustrates a flowchart of the operation of the wearable device according to various embodiments of the present disclosure.

Referring to FIG. 6, the electronic device (the electronic device 201 of FIG. 2) may display a user interface for simultaneously displaying the first execution screen of the first application and the second execution screen of the second application in step 601.

According to various embodiments, the electronic device 201 may receive an input for the user interface in step 603. For example, the electronic device 201 may receive an input (or touch input) on the touch screen (for example, the touch screen 260 of FIG. 2) on which the user interface is displayed.

The electronic device 201 may determine the location of the input (or the touch input) in step 605. For example, the electronic device 201 may determine which execution screen from among the first execution screen and the second execution screen receives the touch input.

The electronic device 201 may determine the type of the input (or the touch input) in step 607. For example, the electronic device 201 may determine whether the received touch input is single-touch input, multi-touch input, touch-and-drag input, swipe input, or pinch input.

The electronic device 201, in step 609, may perform functions for the first application and the second application based on the location and the type of the input (or the touch input).

According to various embodiments, the electronic device 201 may receive an input through a first input device (for example, the first input device 250 of FIG. 2) and a second input device (for example, the second input device 251 of FIG. 2). The electronic device 201 may determine which input device from among the first input device 250 and the second input device receives the input.

For example, when the input is received through the first input device 250 (for example, a bezel type input device), the electronic device 201 may receive an input corresponding to the rotation direction and the rotation level of the first input device 250. Alternatively, when the input is received through the second input device 251 (for example, a watch-stem-type input device), the electronic device 201 may receive an input corresponding to the rotation direction and the rotation level of the second input device 251. Further, when the second input device 251 is pressed, the electronic device 201 may receive an input corresponding to pressing the second input device 251.

FIGS. 7A to 7F illustrate user interfaces for the operation of the wearable device according to various embodiments of the present disclosure.

Figure 7A:
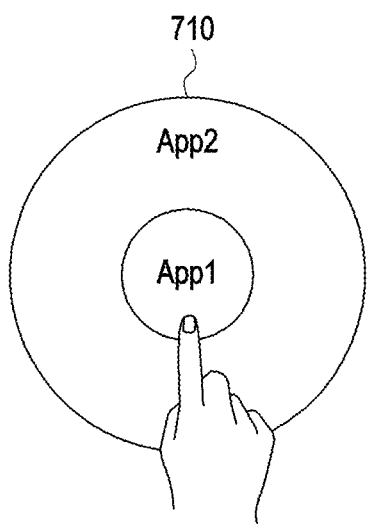
FIGS. 7A to 7F illustrate user interfaces for the operation of the wearable device according to various embodiments of the present disclosure.
Figure 7B:
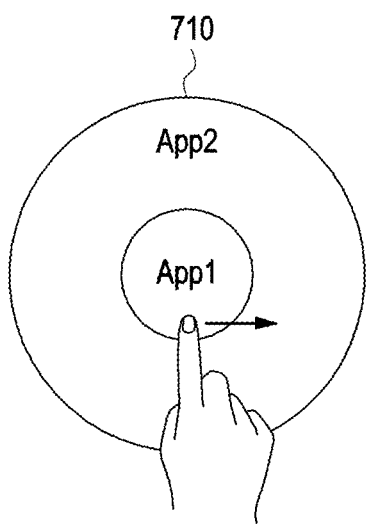

Referring to FIGS. 7A and 7B, the electronic device (the electronic device 201 of FIG. 2) may display a user interface 710 for simultaneously displaying a first execution screen (APP1) of a first application and a second execution screen (APP2) of a second application.

Referring to FIG. 7A, the electronic device 201 may perform a function for the first application (for example, a click or selection function) according to first touch input on the first execution screen (APP1) and perform a function for the second application (for example, a click or selection function) according to second touch input on the second execution screen (APP2).

Referring to FIG. 7B, the electronic device 201 may perform a swipe function for the first application (for example, a page-switching function) according to a swipe input on the first execution screen (APP1). Further, the electronic device 201 may perform a swipe function for the second application (for example, a page-switching function) according to a swipe input on the second execution screen (APP2).

Figure 7C:
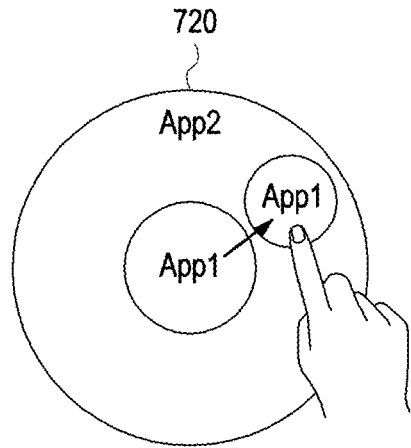

Referring to FIG. 7C, the electronic device 201 may transmit data related to the first application to the second application according to a drag input (or touch-and-drag input) for moving from the first execution screen (APP1) to the second execution screen (APP2).

The electronic device 201 may display a user interface 720 for moving from a screen corresponding to the first execution screen (APP1) (for example, a screen obtained by reducing the first execution screen (APP1)) to the second execution screen (APP2).

Figure 7D:
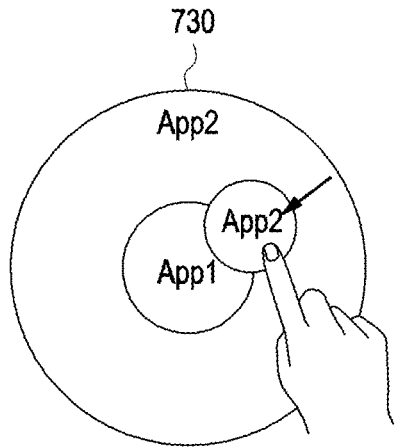

Referring to FIG. 7D, the electronic device 201 may transmit data related to the second application to the first application according to a drag input (or touch-and-drag input) for moving from the second execution screen (APP2) to the first execution screen (APP1).

The electronic device 201 may display a user interface 730 for moving from a screen corresponding to the second execution screen (APP2) (for example, a screen obtained by reducing the second execution screen (APP2)) to the first execution screen (APP1).

Figure 7E:
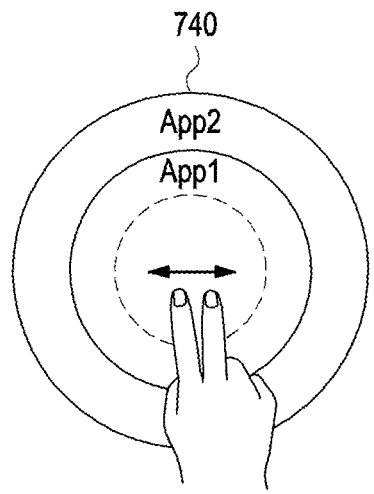
Figure 7F:
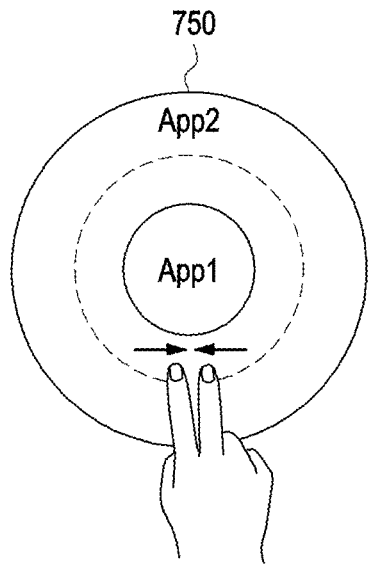

Referring to FIGS. 7E and 7F, the electronic device 201 may control the size of the first execution screen (APP1) according to a pinch input on the first execution screen (APP1). Further, the electronic device 201 may also control the size of the second execution screen (APP2) according to a pinch input on the second execution screen (APP2).

Referring to FIG. 7E, the electronic device 201 may increase the size of the first execution screen (APP1) according to a first pinch input on the first execution screen (APP1).

The electronic device 201 may display a user interface 740 for displaying the first execution screen (APP1) of which the size increases according to a first pinch input corresponding to a first direction.

Referring to FIG. 7F, the electronic device 201 may reduce the size of the first execution screen (APP1) according to a second pinch input on the second execution screen (APP2).

The electronic device 201 may display a user interface 750 for displaying the first execution screen (APP1) of which the size is reduced according to a second pinch input corresponding to a second direction.

Figure 8A:
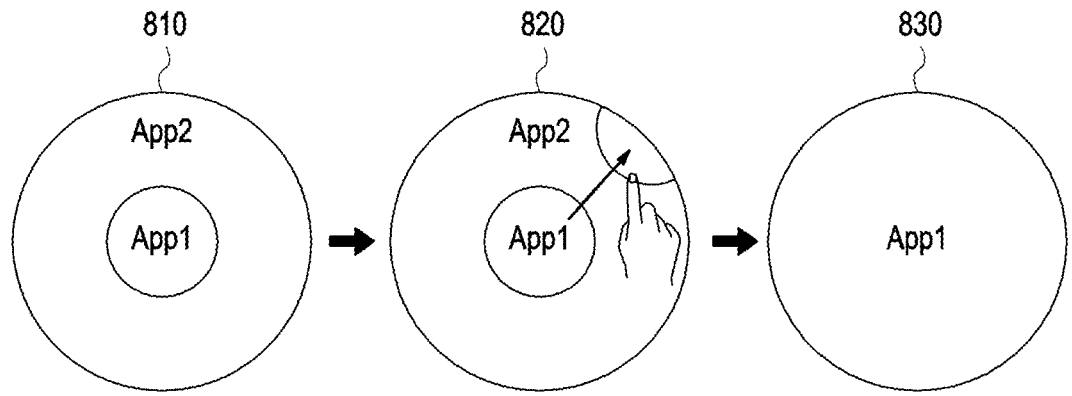
FIGS. 8A to 8C illustrate user interfaces for the operation of the wearable device according to various embodiments of the present disclosure.
Figure 8B:
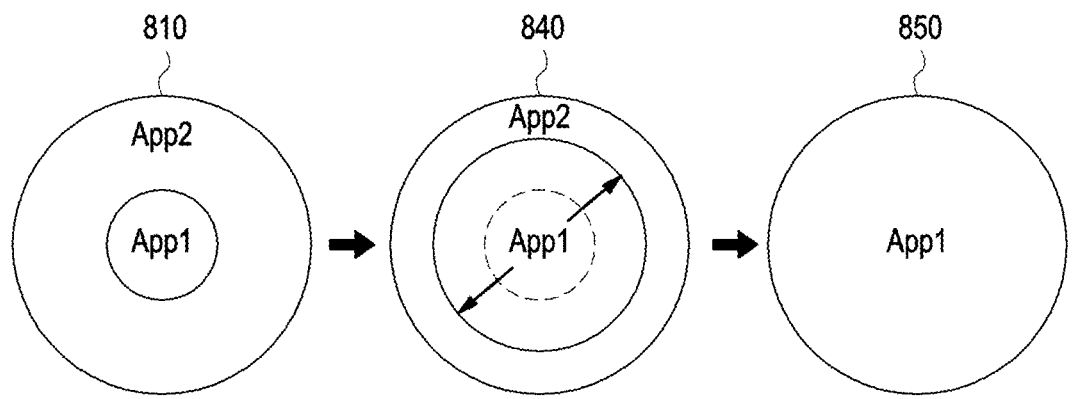
Figure 8C:
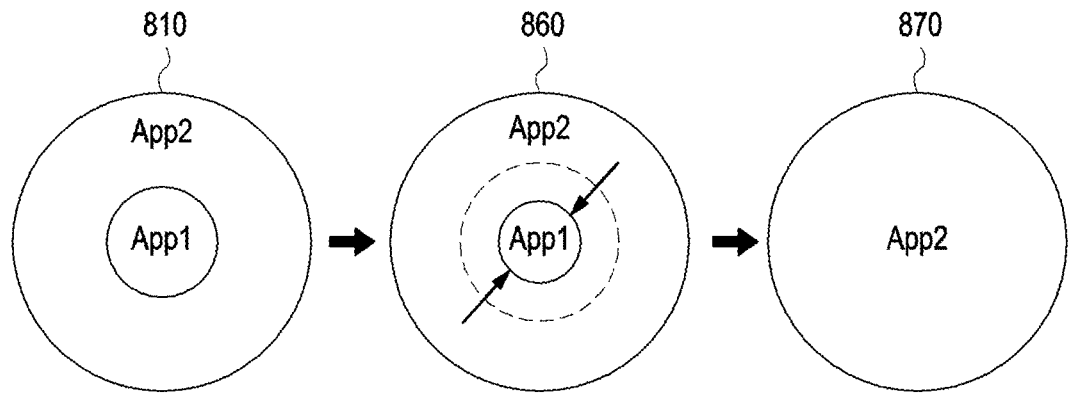

FIGS. 8A to 8C illustrate user interfaces for the operation of the wearable device according to various embodiments of the present disclosure.

Referring to FIGS. 8A to 8C, the electronic device (the electronic device 201 of FIG. 2) may display a user interface 810 for simultaneously displaying a first execution screen (APP1) of a first application and a second execution screen (APP2) of a second application.

Referring to FIG. 8A, the electronic device 201 may display an execution screen 830 of the first application in the entire area of the touch screen (for example, the touch screen 260 of FIG. 2) based on a drag input of moving the first execution screen (APP1) to the outside of the second execution screen (APP2).

According to an embodiment, the electronic device 201 may display a user interface 820 for moving a screen corresponding to the first execution screen (APP1) (for example, a screen obtained by reducing the first execution screen (APP1)) to the second execution screen (APP2) according to a drag input. When the moved screen corresponding to the first execution screen (APP1) stays in an edge area (or an external boundary area) of the second execution screen (APP2) for a predetermined time, the electronic device 201 may display an execution screen 830 of the first application in the entire area of the touch screen 260. At this time, the second application may operate in the background.

Referring to FIG. 8B, the electronic device 201 may display an execution screen 850 of the first application in the entire area of the touch screen (for example, the touch screen 260 of FIG. 2) based on a pinch input for increasing the size of the first execution screen (APP1). The execution screen 850 of the first application may be a screen obtained by enlarging the first execution screen (APP1).

According to an embodiment, the electronic device 201 may display a user interface 840 for increasing the size of the first execution screen (APP1) according to a pinch input. When the increased first execution screen (APP1) becomes larger than a predetermined size, the electronic device 201 may display the execution screen 850 of the first application in the entire area of the touch screen 260. At this time, the second application may operate in the background.

According to an embodiment, the electronic device 201 may again display the user interface 810 for simultaneously displaying the first execution screen (APP1) of the first application and the second execution screen (APP2) of the second application based on a pinch input for reducing the size of the execution screen 850 of the first application. For example, when the reduced execution screen becomes smaller than a predetermined size, the electronic device 201 may display the user interface 810 for simultaneously displaying the first execution screen (APP1) and the second execution screen (APP2).

Referring to FIG. 8C, the electronic device 201 may display an execution screen 870 of the second application in the entire area of the touch screen (for example, the touch screen 260 of FIG. 2) based on a pinch input for reducing the size of the first execution screen (APP1). The execution screen 870 of the second application may be a screen different from the second execution screen (APP2). For example, the execution screen 870 of the second application may be an execution screen suitable for the entire screen of the touch screen 260 from among a plurality of execution screens of the second application.

According to an embodiment, the electronic device 201 may display a user interface 860 for reducing the size of the first execution screen (APP1) according to a pinch input. When the reduced first execution screen (APP1) becomes smaller than a predetermined size, the electronic device 201 may display the execution screen 870 of the second application in the entire area of the touch screen 260. At this time, the first application may operate in the background.

Figure 9A:
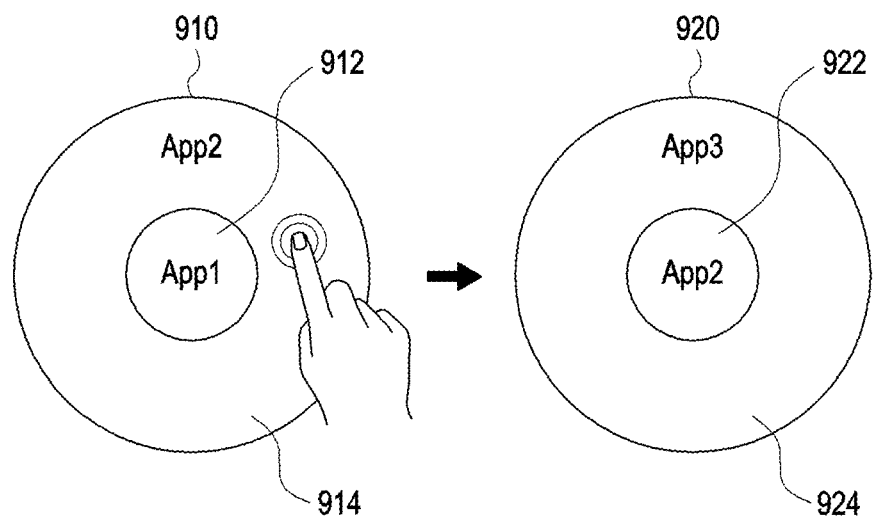
FIGS. 9A and 9B illustrate user interfaces for the operation of the wearable device according to various embodiments of the present disclosure.
Figure 9B:
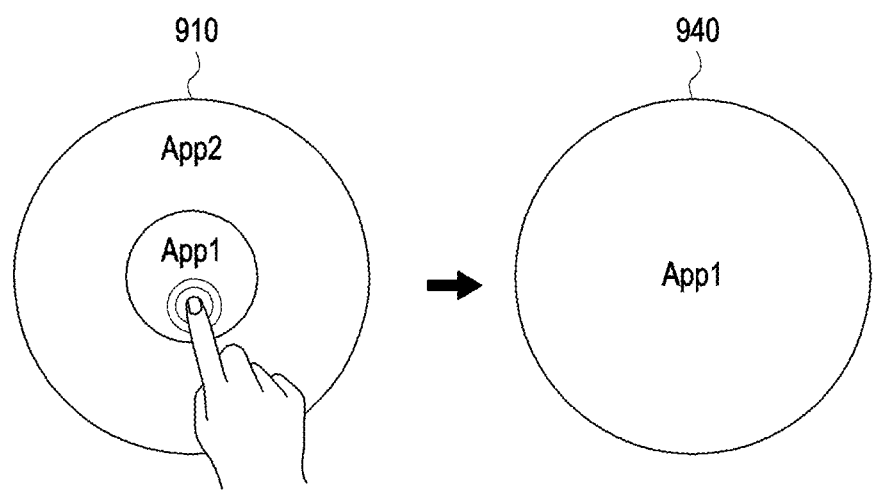

FIGS. 9A and 9B illustrate user interfaces for the operation of the wearable device according to various embodiments of the present disclosure.

Referring to FIGS. 9A and 9B, the electronic device (the electronic device 201 of FIG. 2) may display a user interface 910 for simultaneously displaying a first execution screen 912 of a first application and a second execution screen 914 of a second application. At this time, the first execution screen 912 may be displayed in a first part of the touch screen (for example, the touch screen 260 of FIG. 2) and the second execution screen 914 may be displayed in a second part of the touch screen 260.

Referring to FIG. 9A, when the electronic device 201 receives a first input on the second execution screen 914, the electronic device 201 may execute a third application related to the second application and display a user interface 920 for simultaneously displaying a third execution screen 922 of the second application and a fourth execution screen 924 of the third application. For example, the third application may be an application suitable for being used together with the second application. The third application may be manually determined by the user or automatically determined by the processor (for example, the processor 120 of FIG. 1). The first input may be a long-press input on the second execution screen 914.

According to an embodiment, when the electronic device 201 receives a long-press input on the second execution screen 914, the electronic device 201 may display the third execution screen 922 of the second application in the first part of the touch screen 260, and may display the fourth execution screen 924 of the third application in the second part of the touch screen 260. For example, the third execution screen 922 may be a screen different from the second execution screen 914. That is, the third execution screen 922 may be a screen suitable for being displayed in the first part, from among the plurality of execution screens of the second application. The fourth execution screen 924 may be a screen suitable for being displayed in the second part, from among the plurality of execution screens of the third application.

Referring to FIG. 9B, when the electronic device 201 receives first input on the first execution screen 912, the electronic device 201 may display the execution screen 940 of the first application in the entire area of the touch screen 260. At this time, the second application may operate in the background, or may be terminated. For example, the execution screen 940 of the first application may be a screen obtained by enlarging the first execution screen 912. The first input may be touch input on the first execution screen 912. Alternatively, the first input may be a long-press input on the first execution screen 912.

Figure 10A:
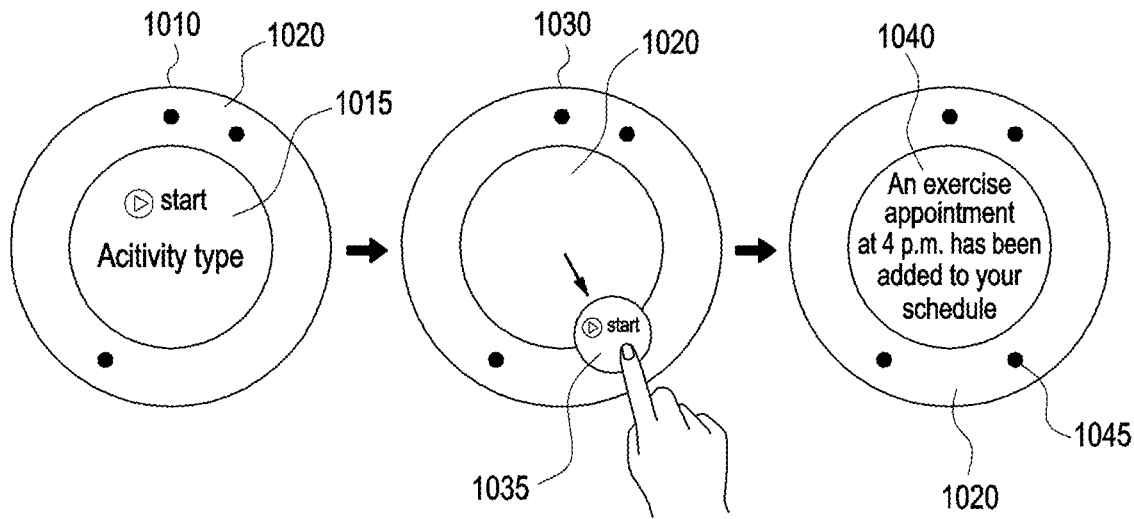
FIGS. 10A to 10C illustrate user interface for the operation of the wearable device according to various embodiments of the present disclosure.
Figure 10B:
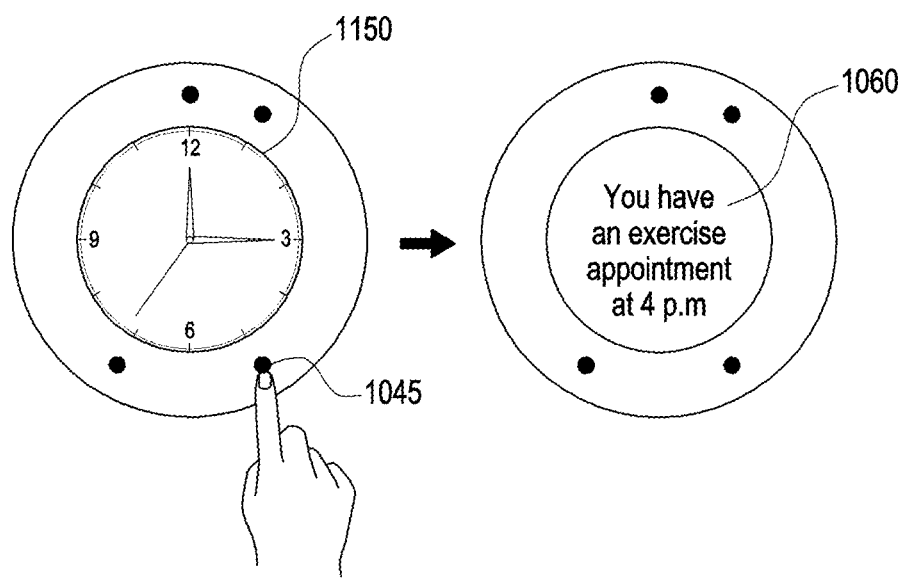
Figure 10C:
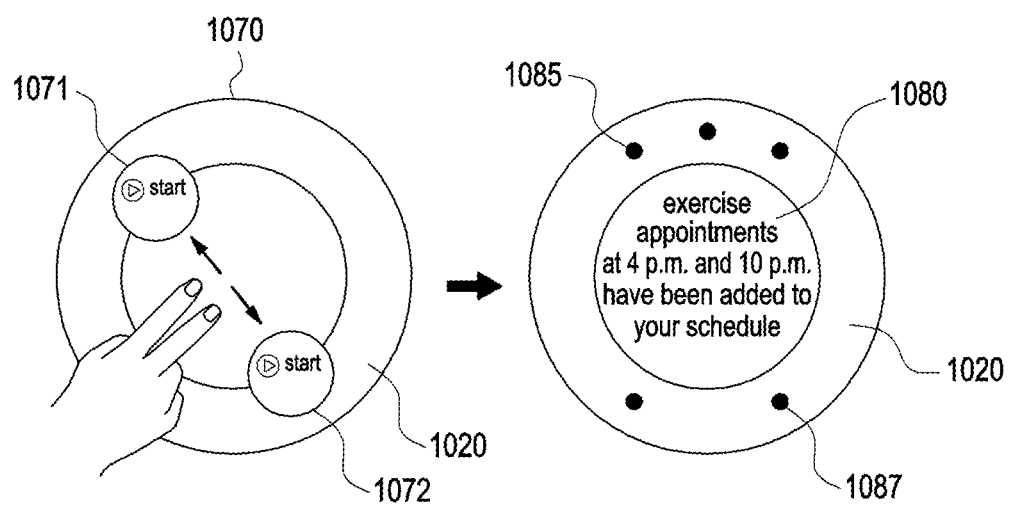

FIGS. 10A to 10C illustrate user interfaces for the operation of the wearable device according to various embodiments of the present disclosure.

Referring to FIG. 10A, the electronic device (the electronic device 201 of FIG. 2) may display a user interface 1010 for simultaneously displaying a first execution screen 1015 of a first application (for example, a health application) and a second execution screen 1020 of a second application (for example, a schedule management application). At this time, the first execution screen 1015 may be displayed in a first part (for example, a central part) of the touch screen (for example, the touch screen 260 of FIG. 2) and the second execution screen 1020 may be displayed in a second part (for example, a part around the central part) of the touch screen 260.

According to an embodiment, the electronic device 201 may display a user interface 1030 for moving a first screen 1035 corresponding to the first execution screen 1015 to the second execution screen 1020 according to drag input. For example, the first screen 1035 may be a screen obtained by reducing the first execution screen 1015 or at least part of the first execution screen 1015.

The electronic device 201 may register data related to the first application (for example, the health application) at a time corresponding to the location at which the drag input is released. For example, when the drag input on the first screen 1035 is released at a particular location (for example, a lower right area) of the second execution screen 1020, the electronic device 201 may identify time information mapped to the particular location and register an appointment related to health at a time (for example, 4 p.m.) corresponding to the particular location. For example, the time information mapped to the second execution screen 1020 may be determined to be the form of a watch based on "today". The time mapped to the second execution screen 1020 may be determined such that one north point on a circle is 12 o'clock and every hour may be determined at every 30 degree interval in a clockwise direction from the one point.

The electronic device 201 may display an icon 1045 indicating schedule registration at a particular location. Further, the electronic device 201 may display information 1040 indicating schedule registration in the first part of the touch screen 260. Alternatively, the electronic device 201 may output information (or a voice) indicating schedule registration through the speaker (for example, the sound output device 155 of FIG. 1).

Referring to FIG. 10B, when the icon 1045 displayed in the second part of the touch screen (for example, the touch screen 260 of FIG. 2) is selected, the electronic device (for example, the electronic device 201 of FIG. 2) may display the information 1060 on the registered schedule in the first part of the touch screen 260. Further, when the icon 1045 displayed in the second part of the touch screen 260 is selected, the electronic device 201 may output the information on the registered schedule through the speaker (for example, the sound output device 155 of FIG. 1).

Referring to FIG. 10C, the electronic device (for example, the electronic device 201 of FIG. 2) may display a user interface 1070 for moving a second screen 1071 and a third execution screen 1072 corresponding to the first execution screen of the first application to the second execution screen 1020 according to a multi-drag input. For example, the second screen 1071 and the third screen 1072 may be screens obtained by reducing the first execution screen or at least part of the first execution screen. Further, the second screen 1071 and the third screen 1072 may be the same screens.

The electronic device 201 may register data related to the first application (for example, the health application) at a time corresponding to each of the locations at which the multi-drag input is released. For example, when the drag inputs on the second screen 1071 and the third screen 1072 are released at a first location (for example, an upper left area) and a second location (for example, a lower right area) of the second execution screen 1020, the electronic device 201 may identify time information mapped to the first location and the second location and register appointments related to health at the time (for example, 10 p.m.) corresponding to the first location and the time (for example, 4 p.m.) corresponding to the second location.

The electronic device 201 may display a first icon 1085 indicating schedule registration at the first location and a second icon 1087 indicating schedule registration at the second location. Further, the electronic device 201 may display information 1080 indicating schedule registration in the first part of the touch screen 260. Alternatively, the electronic device 201 may output information (or a voice) indicating schedule registration through the speaker (for example, the sound output device 155 of FIG. 1).

Figure 11A:
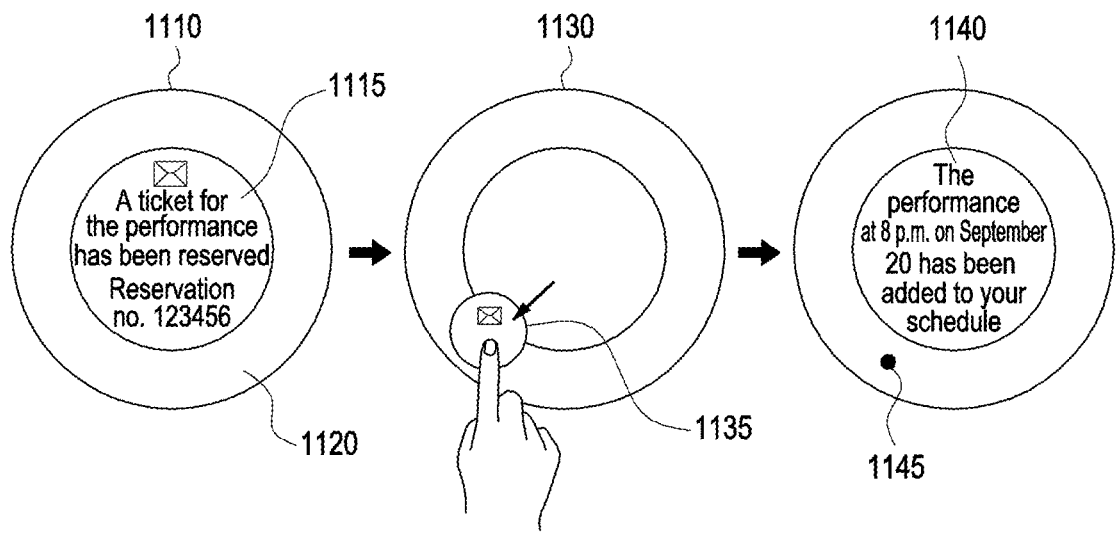
FIGS. 11A and 11B illustrate user interfaces for the operation of the wearable device according to various embodiments of the present disclosure.
Figure 11B:
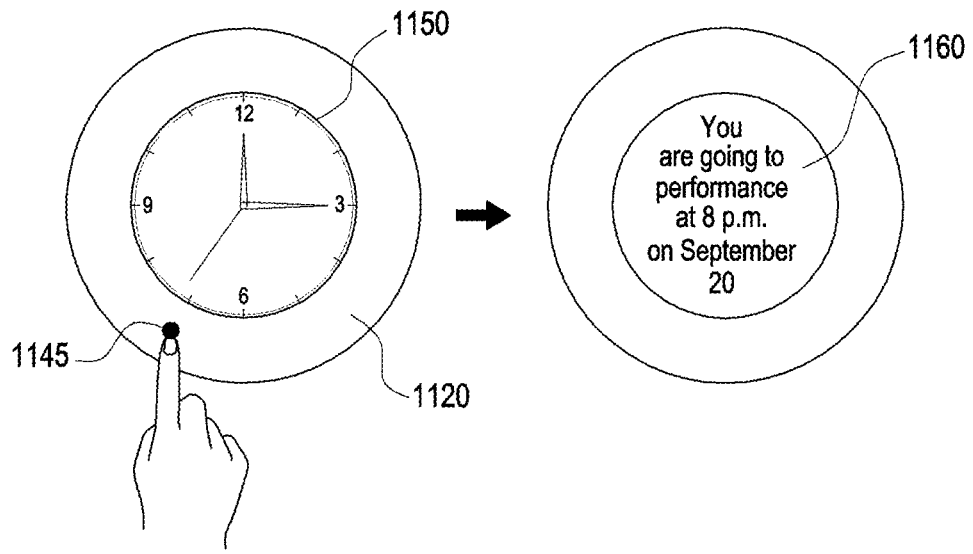

FIGS. 11A and 11B illustrate user interfaces for the operation of the wearable device according to various embodiments of the present disclosure.

Referring to FIG. 11A, the electronic device (the electronic device 201 of FIG. 2) may display a user interface 1110 for simultaneously displaying a first execution screen 1115 of a first application (for example, a mail application, a messenger application, or a text message application) and a second execution screen 1120 of a second application (for example, a schedule management application). At this time, the first execution screen 1115 may be displayed in a first part (for example, a central part) of the touch screen (for example, the touch screen 260 of FIG. 2) and the second execution screen 1120 may be displayed in a second part (for example, a part around the central part) of the touch screen 260.

According to an embodiment, the electronic device 201 may display a user interface 1130 for moving a first screen 1135 corresponding to the first execution screen 1115 to the second execution screen 1120 according to a drag input. For example, the first screen 1135 may be a screen obtained by reducing the first execution screen 1115 or at least part of the first execution screen 1115.

The electronic device 201 may register data related to the first application (for example, the mail application, the messenger application, or the text message application) at a time corresponding to the location at which the drag input is released. For example, when the drag input on the first screen 1135 is released in a particular location (for example, a lower right area) of the second execution screen 1120, the electronic device 201 may identify time information mapped to the particular location and register a schedule related to a performance at a time (for example, 8 p.m. on September 20) corresponding to the particular location.

The electronic device 201 may display an icon 1145 indicating schedule registration at a particular location. Further, the electronic device 201 may display information 1140 indicating schedule registration in the first part of the touch screen 260. Alternatively, the electronic device 201 may output information (or a voice) indicating schedule registration through the speaker (for example, the sound output device 155 of FIG. 1).

Referring to FIG. 11B, the electronic device (the electronic device 201 of FIG. 1) may simultaneously display an execution screen 1150 of the first application (for example, the mail application, the messenger application, or the text message application) and another application (for example, a watch application) as well as the second execution screen 1120 of the second application (for example, the schedule management application).

The second execution screen 1120 may display the icon 1145 for the previously registered schedule. For example, the second execution screen 1120 may display an icon 1145 indicating the registered schedule at a particular location indicating a particular time (8 p.m.).

When the icon 1145 displayed in the second part of the touch screen (for example, the touch screen 260 of FIG. 2) is selected, the electronic device (for example, the electronic device 201 of FIG. 2) may display information 1160 on the registered schedule in the first part of the touch screen 260. Alternatively, when the icon 1145 displayed in the second part of the touch screen 260 is selected, the electronic device 201 may output information (or a voice) on the registered schedule through the speaker (for example, the sound output device 155 of FIG. 1).

Figure 12A:
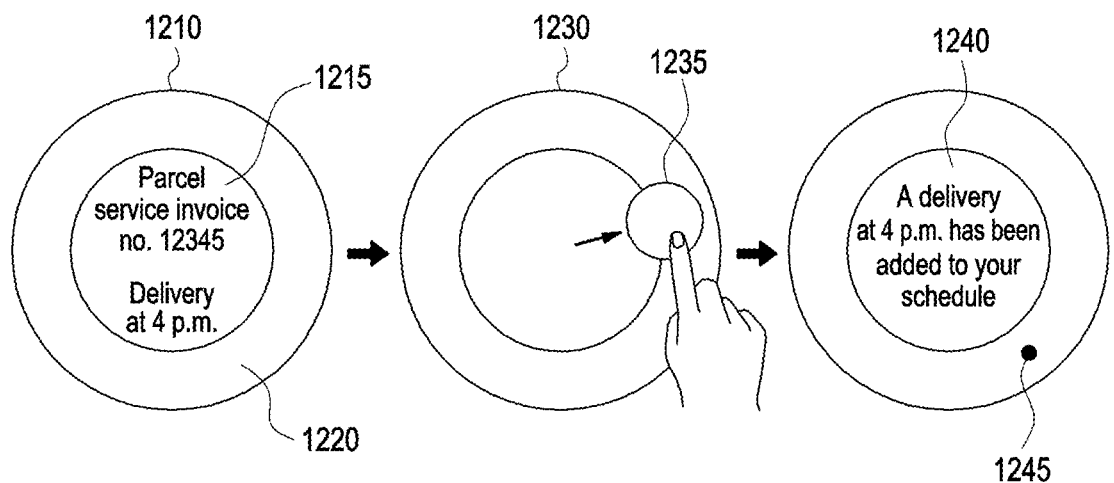
FIGS. 12A and 12B illustrate user interfaces for the operation of the wearable device according to various embodiments of the present disclosure.
Figure 12B:
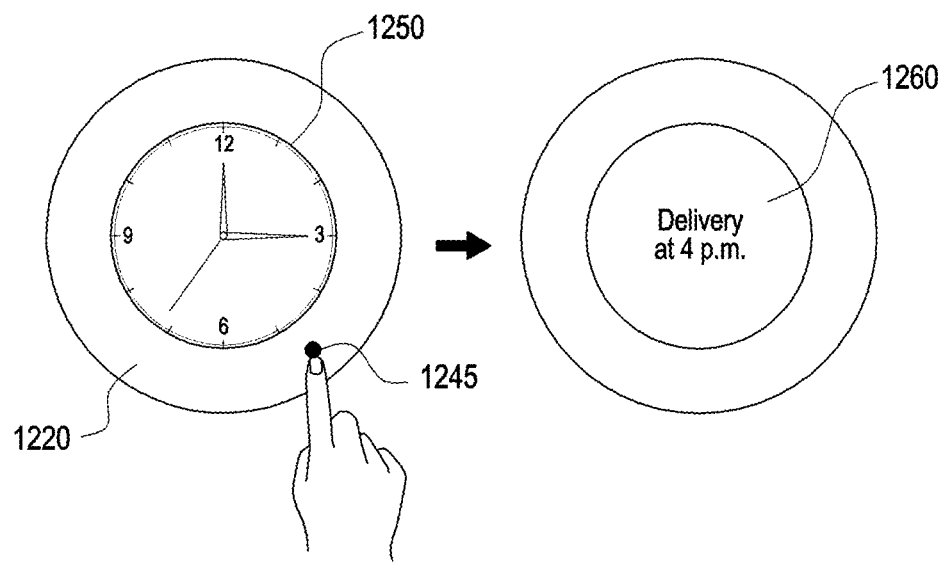

FIGS. 12A and 12B illustrate user interfaces for the operation of the wearable device according to various embodiments of the present disclosure.

Referring to FIG. 12A, the electronic device (the electronic device 201 of FIG. 2) may display a user interface 1210 for simultaneously displaying a first execution screen 1215 of a first application (for example, an email application or a text message application) and a second execution screen 1220 of a second application (for example, a schedule management application). At this time, the first execution screen 1215 may be displayed in a first part (for example, a central part) of the touch screen (for example, the touch screen 260 of FIG. 2) and the second execution screen 1220 may be displayed in a second part (for example, a part around the central part) of the touch screen 260.

According to an embodiment, the electronic device 201 may display a user interface 1230 for moving a first screen 1235 corresponding to the first execution screen 1215 to the second execution screen 1220 according to a drag input. For example, the first screen 1235 may be a screen obtained by reducing the first execution screen 1215 or at least part of the first execution screen 1215.

When the drag input is released on the second execution screen 1220, the electronic device 201 may identify information related to a time included in the first execution screen 1215. The electronic device 201 may register the identified time (for example, 4 p.m.) in the second application (for example, the schedule management application). Further, the electronic device 201 may determine a particular location of the second execution screen corresponding to the identified time (for example, 4 p.m.) and display an icon 1245 indicating schedule registration at the particular location. In addition, the electronic device 201 may display information 1240 indicating schedule registration in the first part of the touch screen 260. Alternatively, the electronic device 201 may output information (or a voice) indicating schedule registration through the speaker (for example, the sound output device 155 of FIG. 1).

Referring to FIG. 12B, the electronic device (the electronic device 201 of FIG. 2) may simultaneously display an execution screen 1250 of the first application (for example, the email application or the text message application) and another application (for example, a watch application) and the second execution screen 1220 of the second application (for example, the schedule management application).

The second execution screen 1220 may display the icon 1245 for the previously registered schedule. For example, the second execution screen 1220 may display the icon 1245 indicating the registered schedule at the particular location indicating the particular time (for example, 4 p.m.).

When the icon 1245 displayed in the second part of the touch screen (for example, the touch screen 260 of FIG. 2) is selected, the electronic device (for example, the electronic device 201 of FIG. 2) may display information 1260 on the registered schedule in the first part of the touch screen 260. Alternatively, when the icon 1245 displayed in the second part of the touch screen 260 is selected, the electronic device 201 may output information (or voice) on the registered schedule through the speaker (for example, the sound output device 155 of FIG. 1).

Figure 13A:
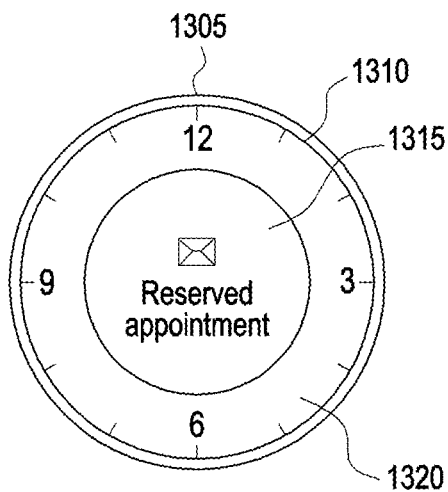
FIGS. 13A to 13C illustrate user interfaces for the operation of the wearable device according to various embodiments of the present disclosure.
Figure 13B:
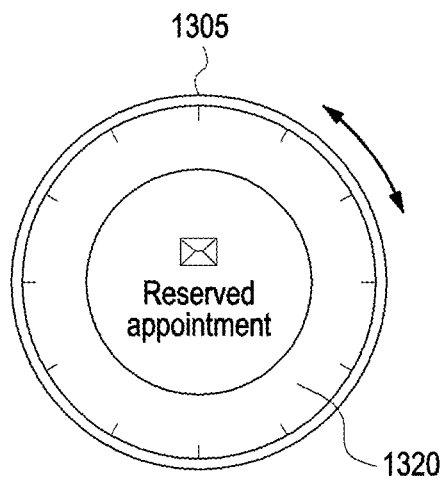
Figure 13C:
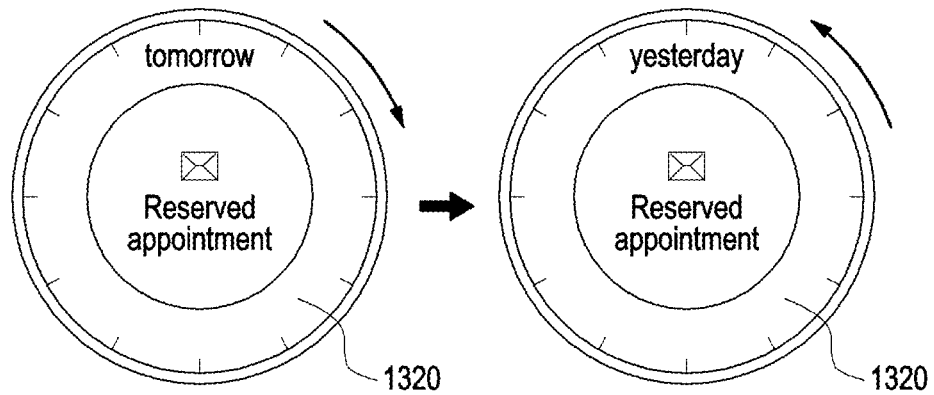

FIGS. 13A to 13C illustrate user interfaces for the operation of the wearable device according to various embodiments of the present disclosure.

Referring to FIG. 13A, the electronic device (the electronic device 201 of FIG. 2) may display a user interface 1310 for simultaneously displaying a first execution screen 1315 of a first application (for example, an email application or a text message application) and a second execution screen 1320 of a second application (for example, a schedule management application). At this time, the first execution screen 1315 may be displayed in a first part (for example, a central part) of the touch screen (for example, the touch screen 260 of FIG. 2) and the second execution screen 1320 may be displayed in a second part (for example, a part around the central part) of the touch screen 260.

The second execution screen 1320 may display information related to a specific time. For example, the second execution screen 1320 may display an indicator and/or a number indicating the time based on "today's date". Further, the second execution screen 1320 may also display information indicating AM or PM.

The electronic device 201 may include a first input device 1305. For example, the first input device may be implemented to be the same as the first input device 250 described with reference to FIG. 2. That is, the first input device 1305 may be implemented in the form of a bezel and the electronic device 201 may identify an input corresponding to the rotation of the first input device 1305.

Referring to FIG. 13B, when the first input device 1305 is rotated, the electronic device (for example, the electronic device 201 of FIG. 2) may display the time for dates other than the date displayed on the second execution screen 1320. For example, when the first input device 1305 is rotated in a first direction (for example, a clockwise direction), the electronic device 201 may display the time for the date corresponding to "tomorrow". When the first input device 1305 is rotated in a second direction (for example, a counterclockwise direction), the electronic device 201 may display the time for the data corresponding to "yesterday". Further, when the first input device 1305 is continuously rotated in the first direction (for example, the clockwise direction), the electronic device 201 may display the time for the following dates, such as "the day after tomorrow" and/or "three days from now".

Referring to FIG. 13C, when the first input device 1305 is rotated in the first direction or the second direction, the electronic device 201 may display information on the corresponding date. For example, when the first input device 1305 is rotated in the first direction, the electronic device 201 may display information indicating "tomorrow" on the second execution screen 1320. When the first input device 1305 is rotated in the second direction, the electronic device 201 may display information indicating "yesterday" on the second execution screen 1320.

According to various embodiments, when the first input device 1305 is rotated in the first direction or the second direction, the electronic device 201 may display a page additionally provided by the second application in the second part of the touch screen 260. When the first input device 1305 is rotated in the first direction or the second direction, the electronic device 201 may display other applications related to the second application in the second part of the touch screen 260.

Figure 14:
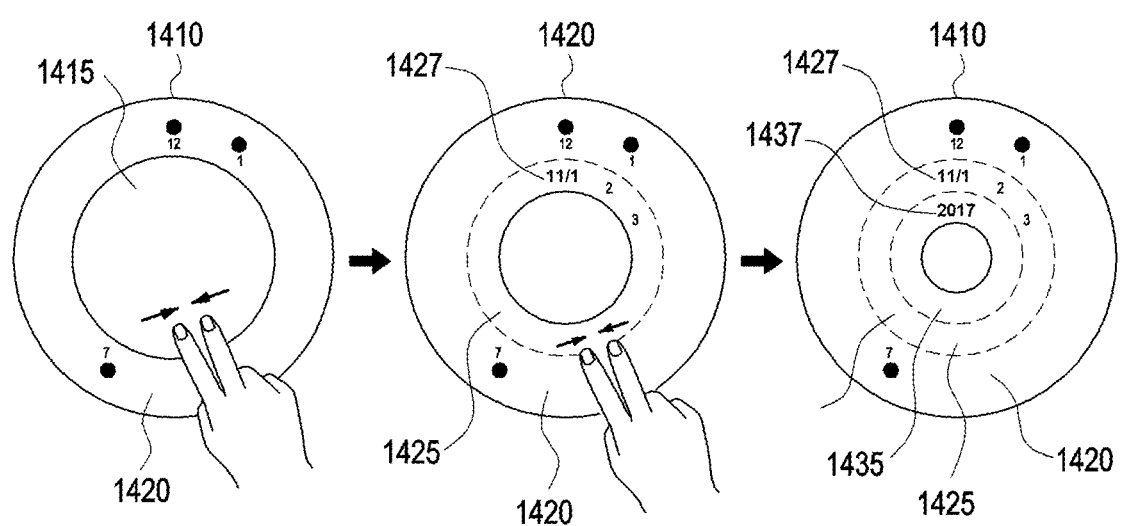
FIG. 14 illustrates a user interface for the operation of the wearable device according to various embodiments of the present disclosure.

FIG. 14 illustrates a user interface for the operation of the wearable device according to various embodiments of the present disclosure.

Referring to FIG. 14, the electronic device (the electronic device 201 of FIG. 2) may display a user interface 1410 for simultaneously displaying a first execution screen 1415 of a first application and a second execution screen 1420 of a second application (for example, a schedule management application). At this time, the first execution screen 1415 may be displayed in a first part (for example, a central part) of the touch screen (for example, the touch screen 260 of FIG. 2) and the second execution screen 1420 may be displayed in a second part (for example, a part around the central part) of the touch screen 260.

The second execution screen 1420 may display an indicator and/or a number indicating a time based on "today's date". Further, the second execution screen 1420 may display icons indicating registered appointments and the time of each of the registered appointments.

The electronic device 201 may reduce the size of the first execution screen 1415 in response to a first pinch input on the first execution screen 1415. Further, the electronic device 201 may increase the size of the second execution screen 1420 by a first area 1425 corresponding to an area obtained by reducing the first execution screen 1415. At this time, the second execution screen 1420 may display additional information in the first area 1425 in response to a first pinch input. For example, the electronic device 201 may additionally display information on the date in the first area 1425. Further, the electronic device 201 may display information 1427 on "today's date" so as to distinguish the same from other dates.

The electronic device 201 may further reduce the size of the first execution screen 1415 in response to a second pinch input in the first area 1425. The electronic device 201 may further increase the size of the second execution screen 1420 by a second area 1435 corresponding to an area obtained by further reducing the first execution screen 1415. At this time, the second execution screen 1420 may display additional information in the second area 1435 in response to a second pinch input. For example, the electronic device 201 may additionally display information on the year in the second area 1435. Further, the electronic device 201 may display information 1437 on "this year" so as to distinguish the same from other years.

The first area 1425 and the second area 1435 may be included in the second execution screen 1420. That is, the second application may further display additional information in the first area 1425 and the second area 1435. Meanwhile, the second application may be displayed such that the existing second execution screen 1420 is distinguished from the newly added first area 1425 and second area 1435. For example, the second application may be displayed such that the existing second execution screen 1420 is displayed with a color and shade different from the first area 1425 and the second area 1435.

Figure 15A:
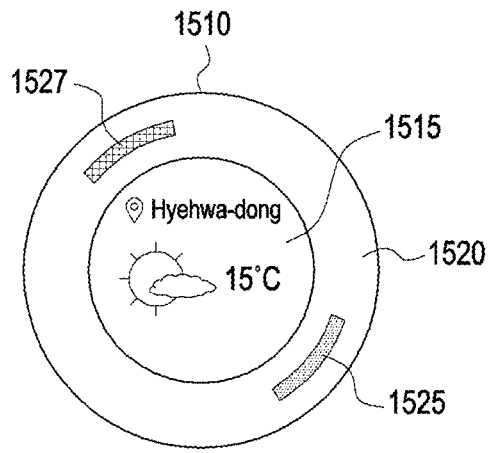
FIGS. 15A to 15C illustrate user interfaces for the operation of the wearable device according to various embodiments of the present disclosure.
Figure 15B:
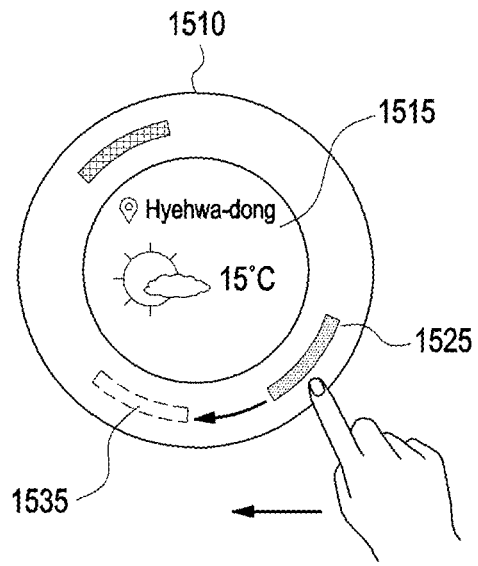
Figure 15C:
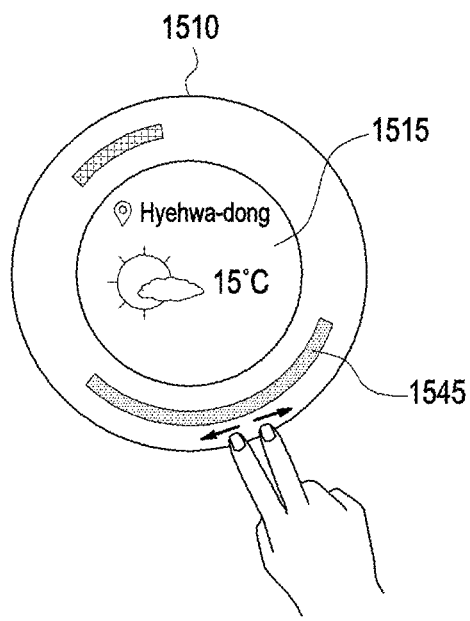

FIGS. 15A to 15C illustrate user interfaces for the operation of the wearable device according to various embodiments of the present disclosure.

Referring to FIG. 15A, the electronic device (the electronic device 201 of FIG. 2) may display a user interface 1510 for simultaneously displaying a first execution screen 1515 of a first application (for example, a weather application or a weather widget) and a second execution screen 1520 of a second application (for example, a schedule management application or an operation management application). At this time, the first execution screen 1515 may be displayed in a first part (for example, a central part) of the touch screen (for example, the touch screen 260 of FIG. 2) and the second execution screen 1520 may be displayed in a second part (for example, a part around the central part) of the touch screen 260.

The first execution screen 1515 may display information on weather. For example, the information on weather may be acquired from an external server (for example, the server 108 of FIG. 1).

The second execution screen 1520 may display operation schedules of external devices according to the time. The second execution screen 1520 may display a first indicator 1525 indicating the operation schedule of a first external device (for example, an air cleaner) and a second indicator 1527 indicating the operation schedule of a second external device (for example, a washing machine).

Referring to FIGS. 15B and 15C, the user may change the operation schedules of the first external device and the second external device by controlling the first indicator 1525 and/or the second indicator 1527 based on weather information displayed on the first execution screen 1515.

Referring to FIG. 15B, the electronic device 201 may move the first indicator 1525 corresponding to a first location to a second location according to drag input. The electronic device 201 may display the first indicator 1535 at the second location according to the drag input. The second application may register the operation schedule of the first external device (for example, an air cleaner) at a time mapped to the second location. Further, the second application may control the first external device to operate at the time mapped to the second location through a communication module (for example, the communication module 190 of FIG. 1) included in the electronic device 201.

Referring to FIG. 15C, the electronic device 201 may enlarge the first indicator 1525, which is a first size, to a second size according to a pinch input. The electronic device 201 may display a first indicator 1545 corresponding to the second size according to the pinch input. The second application may register the operation schedule of the first external device (for example, the air cleaner) at a time mapped to the second size. Further, the second application may control the first external device to operate at the time mapped to the second size through a communication module (for example, the communication module 190 of FIG. 1) included in the electronic device 201.

Similarly, the electronic device 201 may reduce the first indicator 1525 corresponding to the first size to a third size according to a pinch input. The electronic device 201 may display the first indicator corresponding to the second size according to a pinch input. The second application may register the operation schedule of the first external device (for example, the air cleaner) at a time mapped to the third size. Further, the second application may control the first external device to operate at the time mapped to the third size through a communication module (for example, the communication module 190 of FIG. 1) included in the electronic device 201.

Figures 16A, 16B:
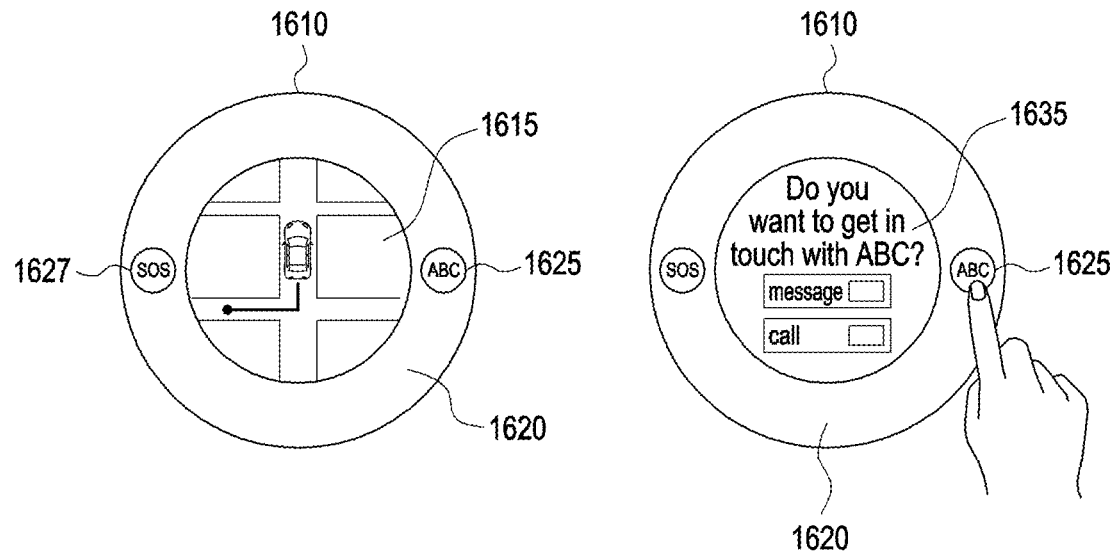
FIGS. 16A and 16B illustrate user interfaces for the operation of the wearable device according to various embodiments of the present disclosure.

FIGS. 16A and 16B illustrate user interfaces for the operation of the wearable device according to various embodiments of the present disclosure.

Referring to FIG. 16A, the electronic device (the electronic device 201 of FIG. 2) may display a user interface 1610 for simultaneously displaying a first execution screen 1615 of a first application (for example, a taxi service application) and a second execution screen 1620 of a second application (for example, a phone application, an emergency call application, and/or a contact application). At this time, the first execution screen 1615 may be displayed in a first part (for example, a central part) of the touch screen (for example, the touch screen 260 of FIG. 2) and the second execution screen 1620 may be displayed in a second part (for example, a part around the central part) of the touch screen 260.

The first execution screen 1615 may display location information of a taxi in which the user is riding. For example, the location information may be provided on the basis of a GPS signal acquired by the electronic device 201.

The second execution screen 1620 may display a favorite contact icon 1625 and an emergency call icon 1627. For example, the favorite contact icon 1625 may correspond to a predetermined favorite contact in the contact application. The emergency call icon 1627 may correspond to a predetermined emergency call number.

Referring to FIG. 16B, the electronic device (for example, the electronic device 201 of FIG. 2) may perform an operation of making a phone call or sending a text message to a favorite contact number in response to a touch input on the favorite contact icon 1625.

When the touch input on the favorite contact icon 1625 is received, the electronic device 201 may display, in a first part of the touch screen 260, a screen 1635 for making a phone call or sending a text message to the favorite contact number. When touch input on the screen 1635 for making a phone call or sending a text message is received, the electronic device 201 may make the phone call or send the text message to the favorite contact number. At this time, the electronic device 201 may transmit location information of the electronic device 201 to the favorite contact number.

Similarly, when a touch input on the emergency call icon 1627 is received, the electronic device 201 may make a phone call or send an emergency text message to an emergency call contact number. At this time, the electronic device 201 may transmit location information of the electronic device 201 to the emergency call contact number.

Figure 17:
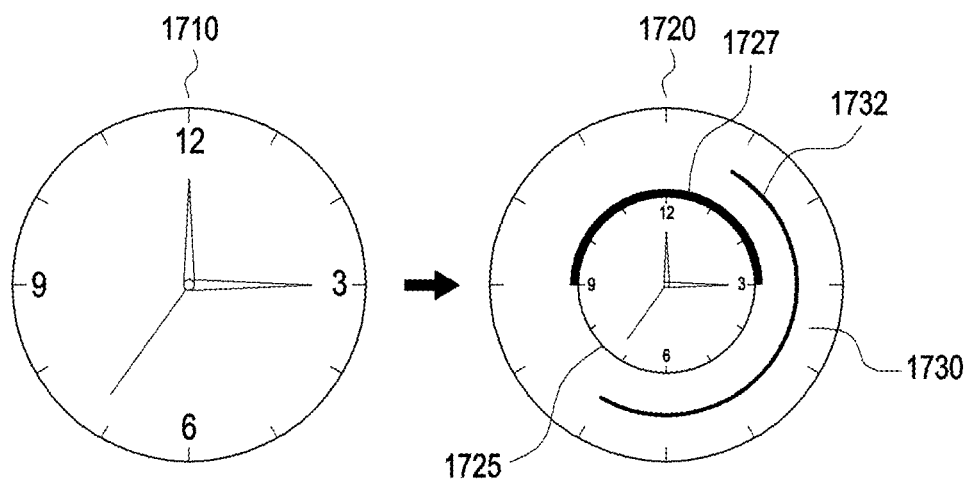
FIG. 17 illustrates a user interface for the operation of the wearable device according to various embodiments of the present disclosure.

FIG. 17 illustrates a user interface for the operation of the wearable device according to various embodiments of the present disclosure.

Referring to FIG. 17, the electronic device (for example, the electronic device 201 of FIG. 2) may execute a first application (for example, a watch application providing a time in a local region) and display a watch face 1710 for the first application on the touch screen (for example, the touch screen 260 of FIG. 2). The watch face 1710 may display a time in the region in which the electronic device 201 is currently located. For example, the watch face 1710 may display an indicator and/or a number indicating the time in the current region.

According to an embodiment, when a long-press input on the watch face 1710 is received, the electronic device 201 may display a user interface 1720 for simultaneously displaying a first execution screen 1725 of a first application (for example, a watch application providing the time in the current region) and a second execution screen 1730 of a second application (for example, a watch application providing the time in another region). At this time, the first execution screen 1725 may be displayed in a first part (for example, a central part) of the touch screen (for example, the touch screen 260 of FIG. 2) and the second execution screen 1730 may be displayed in a second part (for example, a part around the central part) of the touch screen 260. The first execution screen 1725 may be a screen obtained by reducing the watch face 1710.

The first execution screen 1725 may display an indicator and/or a number indicating the time in the current region. The first execution screen 1725 may further display information 1727 on business hours in the current region.

The second execution screen 1730 may display an indicator and/or number indicating the time in another region. Further, the second execution screen 1730 may further display information 1732 on business hours in the other region. The electronic device 201 may display the information 1732 on the business hours in the other region so as to be distinguished from the information 1727 on the business hours in the current region so that the user can compare the business hours in the other region and the business hours in the current region.

Figure 18:
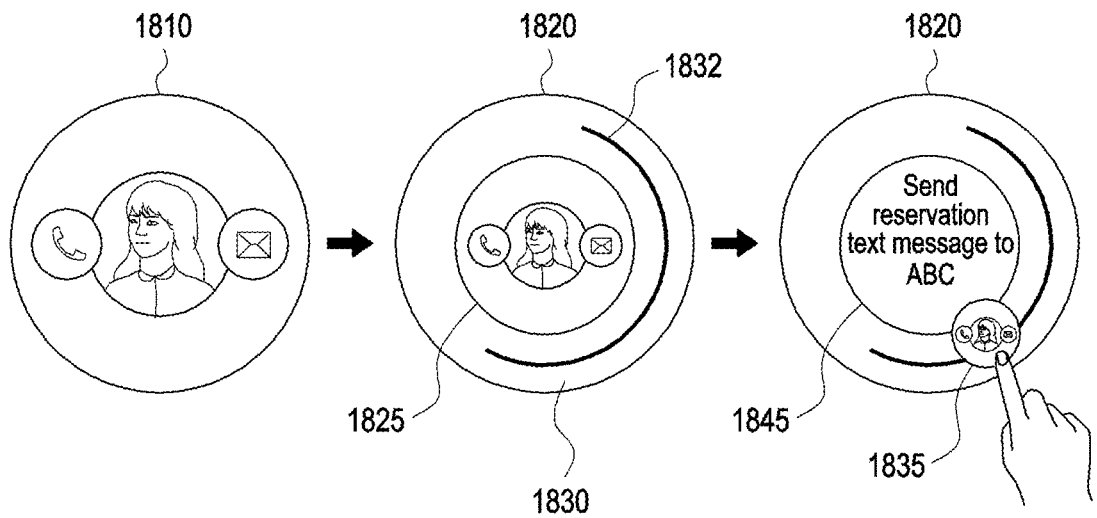
FIG. 18 illustrates a user interface for the operation of the wearable device according to various embodiments of the present disclosure.

FIG. 18 illustrates a user interface for the operation of the wearable device according to various embodiments of the present disclosure.

Referring to FIG. 18, the electronic device (for example, the electronic device 201 of FIG. 2) may execute a first application (for example, a contact application) and display an execution screen 1810 of the first application on the touch screen (for example, the touch screen 260 of FIG. 2). The execution screen 1810 of the first application may be displayed in the entire area of the touch screen 260.

According to an embodiment, when a long-press input on the execution screen 1810 is received, the electronic device 201 may display a user interface 1820 for simultaneously displaying a first execution screen 1825 of a first application (for example, a contact application) and a second execution screen 1830 of a second application (for example, a watch application providing a time in another region). At this time, the first execution screen 1825 may be displayed in a first part (for example, a central part) of the touch screen (for example, the touch screen 260 of FIG. 2) and the second execution screen 1830 may be displayed in a second part (for example, a part around the central part) of the touch screen 260. The first execution screen 1825 may be a screen obtained by reducing the execution screen 1810 of the first application.

The second execution screen 1830 may display an indicator and/or number indicating a time in another region. Further, the second execution screen 1830 may display information 1832 on business hours in the other region.

According to an embodiment, the electronic device 201 may move a first screen 1835 corresponding to the first execution screen 1825 to the second execution screen 1830. For example, the first screen 1835 may be a screen obtained by reducing the first execution screen 1825.

The electronic device 201 may schedule a phone call or a text message related to the first application (for example, the contact application) at a time corresponding to the location at which the drag input is released. The user may make a phone call or send a text message within the business hours of another region with reference to the business hours of the other region displayed on the second execution screen 1830.

Figure 19:
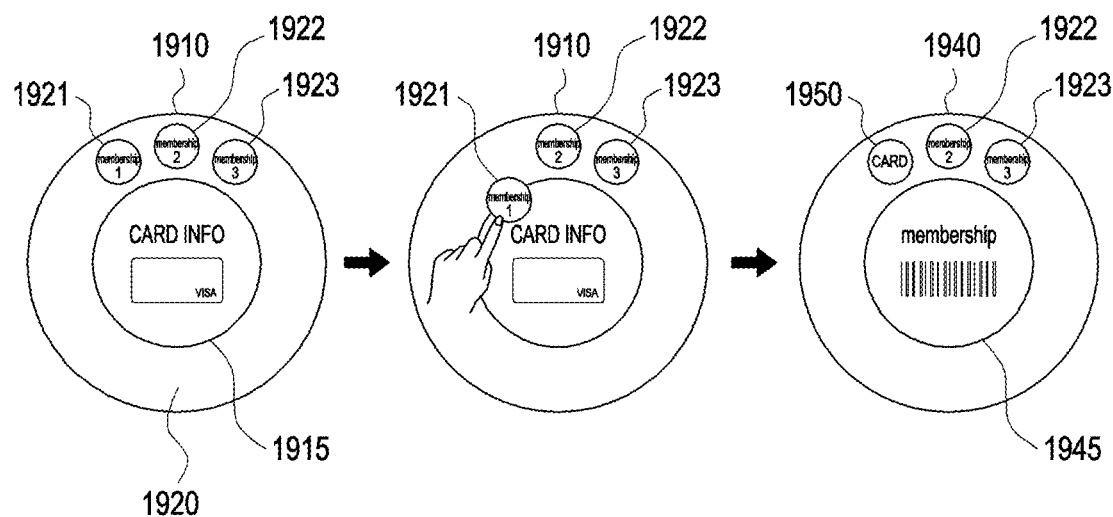
FIG. 19 illustrates a user interface for the operation of the wearable device according to various embodiments of the present disclosure.

FIG. 19 illustrates a user interface for the operation of the wearable device according to various embodiments of the present disclosure.

Referring to FIG. 19, the electronic device (the electronic device 201 of FIG. 2) may display a user interface 1910 for simultaneously displaying a first execution screen 1915 of a first application (for example, a payment application) and at least one second execution screen 1921, 1922, and/or 1923 of at least one second application (for example, a membership application and/or a coupon application). At this time, the first execution screen 1915 may be displayed in a first part (for example, a central part) of the touch screen (for example, the touch screen 260 of FIG. 2), and at least one second execution screen 1921, 1922, and/or 1923 may be displayed in a second part (for example, parts around the central part) of the touch screen 260.

The first execution screen 1915 may display information on a card used to make a payment. For example, the information on the card may be stored in the electronic device 201. At least one second execution screen 1921, 1922, and/or 1923 may display a membership card or coupon information.

According to drag input on an execution screen 1921 selected from the second execution screens 1921, 1922, and/or 1923, the electronic device 201 may move the selected execution screen 1921 to the first execution screen 1915.

The electronic device 201 may display a user interface 1940 for simultaneously displaying an execution screen 1945 of the second application corresponding to the selected execution screen 1921 and an execution screen 1950 of the first application in the first part and the second part of the touch screen 260. That is, the electronic device 201 may display the execution screen 1945 of the second application corresponding to the selected execution screen 1921 in the first part of the touch screen 260 according to a drag input. For example, the execution screen 1945 of the second application may display information on the second application (for example, membership card information, coupon information, and/or barcode information). At this time, the execution screen 1945 of the second application may be a screen different from the execution screen 1921 displayed in the second part.

The electronic device 201 may display the execution screen 1950 of the first application corresponding to the first execution screen 1915 in the part in which the execution screen 1921, which had been displayed in the second part, was located. For example, the execution screen 1950 of the first application may be a screen obtained by reducing the first execution screen or at least part of the first execution screen. Alternatively, the execution screen 1950 of the first application may be a screen different from the first execution screen 1915.

When the execution screen 1950 of the first application displayed in the second part is dragged to the first part in the changed user interface 1940, the electronic device 201 may display the first execution screen 1915 in the first part. That is, the electronic device 201 may change from the user interface to the previous user interface 1910.

A wearable device according to various embodiments of the present disclosure may include a touch screen and a processor configured to display an execution screen of a first application on the touch screen, receive a first input for simultaneously executing the first application and a second application related to the first application, and display a first execution screen corresponding to the execution screen in a first part of the touch screen and a second execution screen from among a plurality of execution screens corresponding to the second application in a second part of the touch screen, different from the first part, in response to the first input, wherein the second part surrounds the first part.

Each of the plurality of execution screens may be a screen indicating the first state of the second application, and the plurality of execution screens may have different configurations from each other.

The processor may be configured to perform a function for the first application according to a first touch input on the first execution screen and a function for the second application according to a second touch input on the second execution screen.

The processor may be configured to transmit data related to the first application to the second application according to a drag input of moving from the first execution screen to the second execution screen.

The processor may be configured to register a schedule related to the first application in the second application according to the drag input when the second application is a schedule management application.

The processor may be configured to display information on the second application in the first part and information on the first application in the second part according to the drag input when the first application and the second application are payment-related applications.

The processor may be configured to determine the second application based on at least one of a type of an application executed after the first application from among applications stored in the wearable device is terminated, the number of executions of the application, and the execution time of the application.

The processor may be configured to, when the first input on the second execution screen is received, display a third execution screen of the second application in the first part of the touch screen and a fourth execution screen of the third application related to the second application in the second part.

The processor may be configured to, when the first input on the first execution screen is received, display the execution screen of the first application on the touch screen.

The wearable device may further include an input device, and the processor may be configured to change information displayed in the second part in response to input received through the input device.

The processor may be configured to control the size of the first part or the second part in response to a pinch input in the first part or the second part.

The processor may be configured to display only the execution screen on the touch screen when the size of the first part is controlled to be larger than a predetermined size.

The processor may be configured to display only the execution screen on the touch screen in response to a drag input of moving from the first part to the second part.

The processor may be configured to execute the second application in a background in response to the drag input.

The first input may be a long-press input in the first part.

The first execution screen may be a screen obtained by reducing the execution screen of the first application or at least part of the execution screen of the first application.

The processor may be configured to display an execution screen of the second application, different from the second execution screen, from among the plurality of execution screens on the touch screen in response to a command of moving the second execution screen to the first part.

A method of operating a wearable device according to various embodiments of the present disclosure may include: an operation of displaying an execution screen of a first application on a touch screen of the wearable device; an operation of receiving a first input for simultaneously executing the first application and a second application related to the first application; and an operation of displaying a first execution screen corresponding to the execution screen in a first part of the touch screen and a second execution screen from among a plurality of execution screens corresponding to the second application in a second part of the touch screen that is different from the first part, in response to the first input, wherein the second part surrounds the first part.

The method may further include an operation of performing a function for the first application according to a first touch input on the first execution screen and a function for the second application according to a second touch input on the second execution screen.

A computer-readable recording medium according to various embodiments may include: an operation of displaying an execution screen of a first application on a touch screen of the wearable device; an operation of receiving a first input for simultaneously executing the first application and a second application related to the first application; and an operation of displaying a first execution screen corresponding to the execution screen in a first part of the touch screen and a second execution screen from among a plurality of execution screens corresponding to the second application in a second part of the touch screen that is different from the first part, in response to the first input, whereby the second part surrounds the first part.

Each of the components of the electronic device according to the present disclosure may be implemented by one or more components and the name of the corresponding component may vary depending on a type of the electronic device. In various embodiments, the inspection apparatus may include at least one of the above-described elements. Some of the above-described elements may be omitted from the electronic device, or the inspection apparatus may further include additional elements. Further, some of the components of the electronic device according to the various embodiments of the present disclosure may be combined to form a single entity, and thus, may equivalently execute functions of the corresponding elements prior to the combination.

Although the present disclosure has been described with various embodiments, various changes and modifications may be suggested to one skilled in the art. It is intended that the present disclosure encompass such changes and modifications as fall within the scope of the appended claims.

What is claimed is:

1. A wearable device comprising:
a touch screen; and
a processor configured to:
display an execution screen of a first application on the touch screen;

receive a first input for simultaneously executing the first application and a second application different from the first application;

in response to the first input, simultaneously executing the first application and the second application; and display a first execution screen corresponding to the execution screen of the first application in a first part of the touch screen and a second execution screen among a plurality of execution screens of the second application in a second part of the touch screen together, the second part the touch screen being different from the first part of the touch screen, wherein the second execution screen surrounds the first execution screen, and wherein the processor is further configured to, when the second application is not designated, determine the second application based on an application that is executed before or after the first application among applications stored in the wearable device and based on at least one of:

a type of the application;
a number of executions of the application; and
an execution time of the application.

2. The wearable device of claim 1, wherein each of the plurality of execution screens is a screen indicating a first state of the second application and the plurality of execution screens has different configurations from each other.

3. The wearable device of claim 1, wherein the processor is further configured to:

perform a function for the first application according to a first touch input on the first execution screen; and
perform a function for the second application according to a second touch input on the second execution screen.

4. The wearable device of claim 1, wherein the processor is further configured to transmit data related to the first application to the second application according to a drag input of moving from the first execution screen to the second execution screen.

5. The wearable device of claim 4, wherein the second application is a schedule management application, and wherein the processor is further configured to register an appointment related to the first application in the second application according to the drag input.

6. The wearable device of claim 4, wherein the first application and the second application are payment-related applications, and wherein the processor is further configured to display information on the second application in the first part of the touch screen and information on the first application in the second part of the touch screen according to the drag input.

7. The wearable device of claim 1, wherein the processor is further configured to, when the first input on the second execution screen is received, display a third execution screen of the second application in the first part of the touch screen and a fourth execution screen of a third application related to the second application in the second part of the touch screen.

8. The wearable device of claim 1, wherein the processor is further configured to, in response to the first input on the first execution screen, display the execution screen of the first application on the touch screen.

9. The wearable device of claim 1, further comprising an input device, wherein the processor is further configured to change information displayed in the second part of the touch screen in response to an input received through the input device.

10. The wearable device of claim 1, wherein the processor is configured to control a size of the first part of the touch screen or the second part of the touch screen in response to a pinch input in the first part of the touch screen or the second part of the touch screen.

11. The wearable device of claim 10, wherein the processor is further configured to display only the execution screen on the touch screen when the size of the first part of the touch screen is controlled to be larger than a predetermined size.

12. The wearable device of claim 1, wherein the processor is further configured to display only the execution screen on the touch screen in response to a drag input of moving from the first part of the touch screen to an external boundary area of the second part of the touch screen.

13. The wearable device of claim 12, wherein the processor is configured to execute the second application in a background in response to the drag input.

14. The wearable device of claim 1, wherein the first input is a long-press input in the first part of the touch screen.

15. The wearable device of claim 1, wherein the first execution screen is a screen obtained by reducing the execution screen of the first application or at least part of the execution screen of the first application.

16. The wearable device of claim 1, wherein the processor is further configured to display an execution screen of the second application different from the second execution screen among the plurality of execution screens on the touch screen in response to a command of moving the second execution screen to the first part of the touch screen.

17. A method of operating a wearable device, the method comprising:

displaying an execution screen of a first application on a touch screen of the wearable device;
receiving a first input for simultaneously executing the first application and a second application different from the first application;
in response to the first input, simultaneously executing the first application and the second application; and
displaying a first execution screen corresponding to the execution screen of the first application in a first part of the touch screen and a second execution screen among a plurality of execution screens of the second application in a second part of the touch screen together, the second part the touch screen being different from the first part of the touch screen,
wherein the second execution screen surrounds the first execution screen, and
wherein the method further comprises, when the second application is not designated, determining the second application based on an application that is executed before or after the first application among applications stored in the wearable device and based on at least one of:
a type of the application;
a number of executions of the application; and
an execution time of the application.

18. The method of claim 17, further comprising:
performing a function for the first application according to a first touch input on the first execution screen; and
performing a function for the second application according to a second touch input on the second execution screen.

19. A non-transitory computer-readable medium embodying a computer program for operating an electronic device including a touch screen and at least one processor, the computer program comprising instructions that, when executed by the at least one processor, cause the electronic device to:
- display an execution screen of a first application on the touch screen;
- receive a first input for simultaneously executing the first application and a second application different from the first application;
- in response to the first input, simultaneously executing the first application and the second application; and
- display a first execution screen corresponding to the execution screen of the first application in a first part of the touch screen and a second execution screen among a plurality of execution screens of the second application in a second part of the touch screen together, the second part the touch screen being different from the first part of the touch screen,
- wherein the second execution screen surrounds the first execution screen, and
- wherein the computer program comprising instructions that, when executed by the at least one processor, further cause the electronic device to, when the second application is not designated, determine the second application based on an application that is executed before or after the first application among applications stored in the electronic device and based on at least one of:
- a type of the application;
- a number of executions of the application; and
- an execution time of the application.

* * * * *